US012309543B2

(12) United States Patent
Yamkovoy

(10) Patent No.: US 12,309,543 B2
(45) Date of Patent: May 20, 2025

(54) WEARABLE AUDIO DEVICE WITH CONTROL PLATFORM

(71) Applicant: Bose Corporation, Framingham, MA (US)

(72) Inventor: Paul G. Yamkovoy, Acton, MA (US)

(73) Assignee: Bose Corporation, Framingham, MA (US)

( * ) Notice: Subject to any disclaimer, the term of this patent is extended or adjusted under 35 U.S.C. 154(b) by 158 days.

(21) Appl. No.: 17/679,443

(22) Filed: Feb. 24, 2022

(65) Prior Publication Data

US 2022/0182752 A1 Jun. 9, 2022

Related U.S. Application Data

(63) Continuation of application No. 16/953,272, filed on Nov. 19, 2020, now Pat. No. 11,509,992.

(51) Int. Cl.
*H04R 1/10* (2006.01)
*G10K 11/178* (2006.01)

(52) U.S. Cl.
CPC ..... *H04R 1/1083* (2013.01); *G10K 11/17823* (2018.01); *G10K 11/17873* (2018.01); *G10K 2210/1081* (2013.01); *G10K 2210/1281* (2013.01); *G10K 2210/3027* (2013.01); *H04R 2460/01* (2013.01)

(58) Field of Classification Search
CPC ......................... H04R 1/1083; H04R 2460/01; H04R 1/1041; H04R 1/1033; H04R 2201/107; G10K 11/17823; G10K 11/17873; G10K 2210/1081; G10K 2210/1281; G10K 2210/3027; G10K 11/17881; G10K 2210/3026; G10K 2210/3033; G10K 2210/30391; G10K 11/17821; G10K 11/1783
USPC ........................................................ 381/71.1
See application file for complete search history.

(56) References Cited

U.S. PATENT DOCUMENTS

| | | | |
|---|---|---|---|
| 4,644,581 | A | 2/1987 | Sapiejewski |
| 5,181,252 | A | 1/1993 | Sapiejewski et al. |
| 6,831,984 | B2 | 12/2004 | Sapiejewski |
| 9,762,990 | B2 | 9/2017 | Sapiejewski et al. |

(Continued)

OTHER PUBLICATIONS

PCT International Search Report and Written Opinion for International Application No. PCT/US2021/058406, dated Feb. 16, 2022, 15 pages.

*Primary Examiner* — Carolyn R Edwards
*Assistant Examiner* — Friedrich Fahnert
(74) *Attorney, Agent, or Firm* — Hoffman Warnick LLC

(57) ABSTRACT

Various aspects include wearable audio devices wearable audio devices with a control platform for managing external device interaction. In some particular aspects, a wearable audio device includes: at least one electro-acoustic transducer; at least one processor; and memory including instructions executable by the at least one processor, wherein the instructions are configured to apply a first equalization (EQ) setting to first audio provided by a first audio source, the first audio to be played using the at least one electro-acoustic transducer, and apply a second EQ setting different from the first EQ setting to second audio provided by a second audio source, the second audio source being different from the first audio source, the second audio to be played using the at least one electro-acoustic transducer.

20 Claims, 8 Drawing Sheets

(56) References Cited

U.S. PATENT DOCUMENTS

| | | | | |
|---|---|---|---|---|
| 2008/0159555 | A1 | 7/2008 | Asada et al. | |
| 2009/0315708 | A1* | 12/2009 | Walley | H03G 7/08 381/107 |
| 2012/0224709 | A1* | 9/2012 | Keddem | H04R 3/00 381/74 |
| 2016/0035342 | A1 | 2/2016 | Lee et al. | |
| 2016/0057555 | A1* | 2/2016 | Schuster | G06F 3/011 381/59 |
| 2016/0203811 | A1* | 7/2016 | Brockmole | H04S 7/30 381/94.5 |
| 2016/0240185 | A1 | 8/2016 | Park et al. | |
| 2017/0019025 | A1* | 1/2017 | Yamkovoy | H02M 3/156 |
| 2017/0026015 | A1* | 1/2017 | Hartung | H03G 3/32 |
| 2017/0064435 | A1* | 3/2017 | Jetter | H04R 1/1008 |
| 2018/0068649 | A1* | 3/2018 | Asada | G10K 11/17875 |
| 2019/0394594 | A1* | 12/2019 | Bush | H03G 3/32 |
| 2021/0397248 | A1* | 12/2021 | Landemaine | G06T 7/55 |

* cited by examiner

WEARABLE AUDIO DEVICE WITH CONTROL PLATFORM

PRIORITY CLAIM

This continuation application claims priority to co-pending patent application Ser. No. 16/953,272 filed on Nov. 19, 2020, the entire contents of which are hereby incorporated by reference.

TECHNICAL FIELD

This disclosure generally relates to wearable audio devices. More particularly, the disclosure relates to wearable audio devices with a control platform for adjusting functionality based, for example, on a coupled accessory and/or a configuration command from a connected control device.

BACKGROUND

Wearable audio devices, for example, headsets, can include modular components for enabling and/or enhancing device functions. In particular form factors, wearable audio devices are configured to enable coupling with external devices (or, accessories) such as microphones (e.g., boom microphones). However, many conventional wearable audio devices are not configured to adapt to the distinct functionality enabled by these external devices.

SUMMARY

All examples and features mentioned below can be combined in any technically possible way.

Various implementations of the disclosure include wearable audio devices with a control platform for managing external device (e.g., accessory) interaction.

In some particular aspects, a wearable audio device includes: an accessory port; at least one processor; and memory including multiple sets of active noise reduction (ANR) configurations, the memory including instructions executable by the at least one processor, where the instructions are configured to select a first ANR configuration upon powering on the wearable audio device, the selection of the first ANR configuration based on an accessory connected to the accessory port, and automatically switch to a second ANR configuration in response to a trigger, where the second ANR configuration is different from the first ANR configuration.

In other particular aspects, a wearable audio device includes: a driver for providing an audio output; an accessory port; at least one processor; and memory including multiple sets of active noise reduction (ANR) configurations, the memory including instructions executable by the at least one processor, where the instructions are configured to select a first ANR configuration upon powering on the wearable audio device, the selection of the first ANR configuration based on an accessory connected to the accessory port, and automatically switch to a second ANR configuration in response to a trigger, where the second ANR configuration is different from the first ANR configuration, and where the trigger comprises detecting an overload event at the driver.

In additional particular aspects, a wearable audio device includes: at least one electro-acoustic transducer; at least one processor; and memory including instructions executable by the at least one processor, wherein the instructions are configured to apply a first equalization (EQ) setting to first audio provided by a first audio source, the first audio to be played using the at least one electro-acoustic transducer, and apply a second EQ setting different from the first EQ setting to second audio provided by a second audio source, the second audio source being different from the first audio source, the second audio to be played using the at least one electro-acoustic transducer.

In further particular aspects, a method of controlling a wearable audio device having at least one electro-acoustic transducer includes: applying a first equalization (EQ) setting to first audio provided by a first audio source, the first audio to be played using the at least one electro-acoustic transducer, and applying a second EQ setting different from the first EQ setting to second audio provided by a second audio source, the second audio source being different from the first audio source, the second audio to be played using the at least one electro-acoustic transducer.

Implementations may include one of the following features, or any combination thereof.

In certain aspects, the trigger includes disconnecting the accessory from the accessory port.

In some implementations, the trigger includes connecting another accessory different from the accessory to the accessory port.

In particular cases, the trigger includes selection of the second ANR configuration by a user.

In certain implementations, selection of the second ANR configuration by the user is performed using a computing device application.

In particular aspects, selection of the second ANR configuration by the user is performed by manipulation of a mechanical switch.

In certain cases, the accessory includes a power source.

In some implementations, the wearable audio device further includes: another accessory port, where power from the accessory is passed through the wearable audio device to the other accessory port to provide power to another accessory.

In particular aspects, the accessory includes a cable configured to attach the wearable audio device to at least one other device.

In certain implementations, the accessory includes a microphone.

In some cases, the accessory includes a sensor module configured to sense at least one of user biometric data, user motion, or an environmental characteristic.

In particular aspects, the accessory connects to at least one sensor that is remote from the wearable audio device.

In certain implementations, the second ANR configuration is user-customizable.

In particular cases, the first ANR configuration is the same as an ANR configuration used prior to powering on the wearable audio device.

In some aspects, the first and second ANR configurations include different filter coefficients.

In certain cases, the accessory includes an identifier, and the instructions are further configured to: read the accessory identifier prior to selecting the first ANR configuration.

In particular implementations, the first ANR configuration is a component of a first profile and the second ANR configuration is a component of a second profile, such that selecting the first ANR configuration includes selecting the first profile and automatically switching to the second ANR configuration includes automatically switching to the second profile, where the first and second profiles differ in at least one other aspect.

In certain cases, the at least one other aspect includes at least one of: audio playback configuration, microphone pickup configuration, power management configuration, hear-through configuration, or sensor configuration.

In some aspects, the second ANR configuration includes relatively lower ANR performance than the first ANR configuration, and the wearable audio device automatically switches to the second ANR configuration in response to an ambient noise level exceeding a threshold.

In particular cases, the ambient noise level is measured using at least one of a feedforward microphone signal path, a voltage applied to a driver by a feedback ANR circuit, or power consumption of the feedback ANR circuit.

In certain implementations, the wearable audio device is an aviation wearable audio device, and the accessory is a down-cable configured to connect to an aircraft, such that the first ANR configuration is selected based on the down-cable that is connected to the accessory port.

In particular aspects, the wearable audio device is an aviation wearable audio device, and the memory comprises multiple memory chips for storing separate operating profiles for the aviation wearable audio device.

In some cases, the separate operating profiles include a primary operating profile that complies with an aviation operating standard and a secondary operating profile that does not comply with the aviation operating standard.

In particular implementations, at least one of the memory chips is dedicated to the primary operating profile and inhibits alteration of the primary operating profile (e.g., write-protection and/or tamper-proofing). In some of these aspects, an additional memory chip stores the secondary operating profile and enables alteration of the secondary operating profile (e.g., write-enabled).

In certain cases, the primary operating profile is loaded as a default operating profile upon powering on the aviation wearable audio device.

In particular aspects, a warning is provided in response to a user command to adjust the operating profile from a profile in compliance with an aviation operating standard to a profile not in compliance with the aviation operating standard.

In some implementations, the memory chip provides its content to a local software CODEC for loading the primary operating profile without requiring an external computing device.

In some aspects, the wearable audio device is an aviation wearable audio device having both primary communication functionality and secondary functionality, and wherein the second ANR configuration coincides with a fail-safe operating mode that disables the secondary functionality to prioritize the primary communication functionality.

In particular cases, the trigger for automatically switching to a fail-safe operating mode includes detecting an indicator of a power supply failure, a device failure and/or receiving a user command.

In certain implementations, the instructions, when executed by the processor, are configured to monitor both primary audio and secondary audio.

In some cases, the processor is configured to equalize the secondary audio separately from the primary audio.

In particular aspects, the primary audio includes intercommunication (intercom) audio and/or radio communication audio, and the secondary audio includes auxiliary (AUX) audio (e.g., AUX-input audio) and/or wireless protocol (e.g., Bluetooth, BLE, etc.) audio.

In some cases, where the first audio includes at least one of intercom audio or radio communication audio, and wherein the second audio includes at least one of auxiliary audio or wireless protocol audio.

In certain implementations, the memory includes multiple sets of equalization (EQ) configurations.

In particular cases, the multiple sets of EQ configurations include at least one EQ configuration for the primary audio and at least one EQ configuration for the secondary audio.

In some aspects, the first audio includes communication-based audio.

In particular cases, the first EQ setting is applied to enhance voice intelligibility of the communication-based audio.

In certain implementations, the second audio includes music playback audio.

In some cases, the second EQ setting is applied to enhance at least one of musical clarity or user preferences for music audio playback.

In particular implementations, applying the first EQ setting and the second EQ setting is performed in response to detecting an input type for each of the first audio source and the second audio source.

In certain aspects, the first audio includes primary audio and the second audio includes secondary audio.

In some implementations, the second EQ setting is applied to the secondary audio separately from the first EQ setting applied to the primary audio.

In particular cases, the primary audio includes at least one of intercom audio or radio communication audio, and wherein the secondary audio includes at least one of auxiliary audio or wireless protocol audio.

In certain implementations, at least one of the first EQ setting or the second EQ setting is adjustable based on a selected audio prioritization mode in a set of audio prioritization modes.

In certain cases, in a first audio prioritization mode, the first audio is mixed with the second audio, and in a second audio prioritization mode, the first audio is played and the second audio is temporarily muted.

In particular aspects, the instructions are further configured to: adjust at least one of the first EQ setting or the second EQ setting in response to receiving a command to switch the selected audio prioritization mode.

In some cases, the command to switch the selected audio prioritization mode is received at an interface on the wearable audio device.

In certain implementations, the interface includes a control feature configured to perform a first function when actuated while a first profile is active on the wearable audio device and perform a second function when actuated while a second profile is active on the wearable audio device.

In particular aspects, the command includes actuation of the control feature to toggle through distinct audio prioritization modes.

In some implementations, the wearable audio device further includes an accessory port, where at least one of the first EQ setting or the second EQ setting is selected upon powering on the wearable audio device based on an accessory connected to the accessory port.

In particular cases, the instructions in the memory are further configured to switch between the first EQ setting and the second EQ setting based on detecting at least one of: disconnecting the accessory from the accessory port, or connecting another accessory different from the accessory to the accessory port.

In certain aspects, the instructions are configured to switch from the first EQ setting to the second EQ setting in response to the second audio being received from the second audio source.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
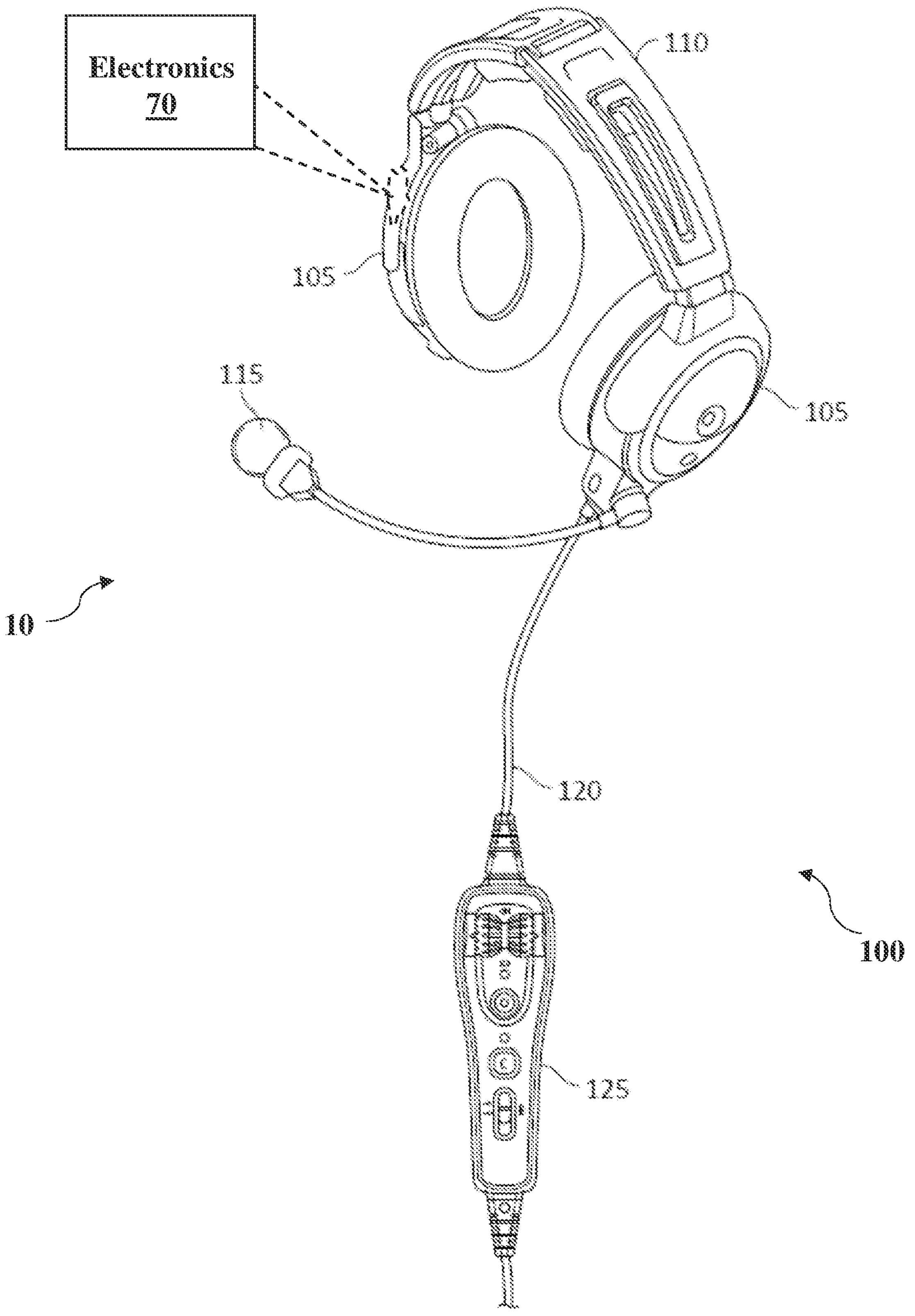
FIG. 1 is a schematic depiction of an audio device according to various implementations.

It is noted that the drawings of the various implementations are not necessarily to scale. The drawings are intended to depict only typical aspects of the disclosure, and therefore should not be considered as limiting the scope of the invention. In the drawings, like numbering represents like elements between the drawings.

DETAILED DESCRIPTION

As noted herein, various aspects of the disclosure generally relate to wearable audio devices with a control platform for managing accessory (e.g., external device) connections, noise reduction and/or equalization configurations, operating profiles and operating modes. In particular cases, the wearable audio device is configured to adjust active noise reduction (ANR) configurations based on an accessory connection.

Commonly labeled components in the FIGURES are considered to be substantially equivalent components for the purposes of illustration, and redundant discussion of those components is omitted for clarity.

Aspects and implementations disclosed herein may be applicable to a wide variety of wearable audio devices. In some cases, wearable audio devices can take various form factors, such as headphones (whether on or off ear), headsets, watches, eyeglasses, audio accessories or clothing (e.g., audio hats, audio visors, audio jewelry), a helmet (e.g., for military, industrial, or motorcycle applications), neck-worn speakers, shoulder-worn speakers, body-worn speakers, etc. Some aspects disclosed may be particularly applicable to personal (wearable) audio devices such as over-ear headphones, on-ear headphones, in-ear headphones (also referred to as earbuds), audio eyeglasses or other head-mounted audio devices.

The wearable audio devices described according to various implementations can include features found in one or more other wearable electronic devices, such as smart glasses, smart watches, etc. These wearable audio devices can include additional hardware components, such as one or more cameras, location tracking devices, microphones, etc., and may be capable of voice recognition, visual recognition, and other smart device functions. The description of wearable audio devices included herein is not intended to exclude these additional capabilities in such a device.

As noted herein, conventional wearable audio devices are not readily adapted for distinct uses, e.g., based on accessory or other external component attachment. Additionally, conventional wearable audio devices are not configured to apply distinct ANR configurations, EQ settings, etc., based on the accessory attached. Even further, conventional wearable audio devices are not configured to apply distinct operating profiles or prioritize communication functionality according to one or more predefined conditions. Various implementations include wearable audio devices and related systems that address the above-noted shortcomings in conventional devices. The wearable audio device is primarily described herein in the context of a headset (e.g., over-ear or in-ear), but the present disclosure is not intended to be so limited unless explicitly stated otherwise.

The wearable audio devices described herein can be used for various different applications, such as for aviation, aerospace, military (e.g., for use in vehicles and/or for dismounted applications), broadcasting, coaching (e.g., for sports/athletics, such as football games), gaming, industrial (e.g., manufacturing, warehouse), construction, conferencing, vehicle-based transportation services (e.g., truck or van deliveries), auto racing, motorcycle or motorbikes, professional audio (e.g., studio production, audio mixing, live performances), and general lifestyle applications (e.g., consumer electronic wearable audio device, such as headphones or earbuds), as well as other applications that can be understood based on this disclosure. Moreover, a single wearable audio device (e.g., a single headset) can be used for multiple different applications, as the control platform of the audio device enables customizing the audio device to optimize suitability for the different applications. In some implementations, the customization of the audio device control platform occurs automatically based on one or more accessories that are connected to the audio device. Other triggers can be alternatively or additionally used to customize the audio device, such as based on user input using a connected control module (e.g., using an in-line control module and/or a mobile device application), environmental conditions (e.g., ambient noise level), sensor input (e.g., atmospheric pressure), or other triggers as will be apparent in light of this disclosure.

Some example implementations relate to audio devices that include aviation headsets. Aviation headsets are used by pilots in both general aviation and commercial aviation. Such headsets can be connected to aircraft communication systems, for example to communicate with air-traffic control (ATC) or with other pilots. The headsets can also be used as a public addressing system, for example, for the pilots to speak with passengers on board the aircraft. The aircraft communication systems typically include an analog communication system such as an intercom. In some cases, such an intercom system can be configured to communicate over the very-high-frequency (VHF) bands (e.g., 18 MHz to 136.975 MHz) wherein each channel is separated from the adjacent ones by a band of pre-specified width (e.g., 8.33 kHz in Europe, 25 kHz elsewhere). An analog modulation technique such as amplitude modulation (AM) can be used for the communications, and the conversations may be performed in simplex mode. In some cases, for example, for trans-oceanic flights, other frequency bands such as high-frequency (HF) bands can be used for satellite communications. Aviation headsets may be used, for example, by pilots and air-traffic controllers to communicate with one another. Even within the context of aviation use cases, the headset could be optimized based on the class or specific aircraft being used. For instance, classes could include, e.g., propeller aircraft, jet airliner, or helicopter, while specific aircrafts could include, e.g., the Boeing 737, Boeing 777, Airbus A320, or McDonnell Douglas DC-9.

An example of a wearable audio device 10 that includes an aviation headset 100 is shown in FIG. 1. In particular cases, the headset 100 includes a frame that has at least one earpiece (e.g., ear-cup) 105 on each side, which fits on, around, or over the ear of a user. In some cases, the frame is optional, such that the earpiece 105 is either tethered or wirelessly connected to other components in the wearable audio device 10. Each of the ear-cups 105 houses acoustic transducers or speakers. The headset 100 also includes a headband (e.g., an over-the-head bridge) 110 for connecting the two earpieces (e.g., ear-cups) 105. In various implementations, the headset 100 is configured to position at least one, and in some cases both, earpieces 105 proximate ears of the user. For example, the headset 100 (and other headset forms of audio device 10 described herein) can be configured, when worn by a user, to position the earpiece(s) 105 proximate to a user's ear. In certain cases, this proximity includes positioning the earpiece(s) 105 on or over the ears (e.g., using earcups), in the ears (e.g., using earbuds), resting on the ears (e.g., using ear hooks), etc. In some cases, proximate positioning results in full, partial, or no occlusion of the user's ear.

In some implementations, an electronic component (e.g., a microphone such as a boom microphone) 115 may be physically connected to one of the ear-cups 105. The headset 100 can be connected to the aircraft intercom system using the connecting cable 120, which may also include a control module 125 that includes one or more controls for the headset 100. In certain cases, the analog signals to and from the aircraft intercom system are transmitted through the wired connection provided by the connecting cable 120. In other cases, or in additional cases, the headset 100 can include electronics 70, such as control chips and/or circuitry, electro-acoustic transducer(s), microphones and associated modules, power components such as batteries and/or connectors, interface components such as capacitive touch interface components, etc. In particular cases, the electronics 70 include a controller coupled with an electro-acoustic transducer, where the controller is also configured to connect with an electronic component (e.g., when in a locked position with the audio device 10). In various implementations, the controller includes one or more processors, and is configured to communicate with an on-board memory and/or one or more remote storage devices.

It is further understood that electronics 70 can include other components not specifically depicted in the accompanying FIGURES, such as communications components (e.g., a wireless transceiver (WT)) configured to communicate with one or more other electronic devices connected via one or more wireless networks (e.g., a local WiFi network, Bluetooth connection, or radio frequency (RF) connection), and amplification and signal processing components. Electronics 70 can also include motion and/or position tracking components, such as optical tracking systems, inertial measurement units (IMUs) such as a microelectromechanical system (MEMS) device that combines a multi-axis accelerometer, gyroscope, and/or magnetometer, etc.

While the example in FIG. 1 illustrates an aviation headset that includes around-ear ear-cups, aviation headsets having other form-factors, including those having in-ear headphones or on-ear headphones, are also compatible with the technology described herein. In an example involving in-ear headphones, the over-the-head bridge may be omitted, and the boom microphone may be attached to the user via the headset or via a separate structure. Also, the term headset, as used in this document, includes various types of acoustic devices that may be used for aviation purposes, including, for example, earphones and earbuds. Additional headset features are disclosed, for example, in U.S. patent application Ser. No. 15/238,259 ("Communications Using Aviation Headsets," filed Aug. 16, 2016), which is incorporated herein by reference in its entirety.

It is further understood that any component described as connected or coupled to another component in the audio device 10 or other systems disclosed according to implementations may communicate using any conventional hard-wired connection and/or additional communications protocols. In some cases, communications protocol(s) can include a Wi-Fi protocol using a wireless local area network (LAN), a communication protocol such as IEEE 802.11 b/g a cellular network-based protocol (e.g., third, fourth or fifth generation (3G, 4G, 5G cellular networks) or one of a plurality of internet-of-things (IoT) protocols, such as: Bluetooth, BLE Bluetooth, ZigBee (mesh LAN), Z-wave (sub-GHz mesh network), 6LoWPAN (a lightweight IP protocol), LTE protocols, RFID, ultrasonic audio protocols, etc. In various particular implementations, separately housed components in audio device 10 are configured to communicate using one or more conventional wireless transceivers.

Figure 2:
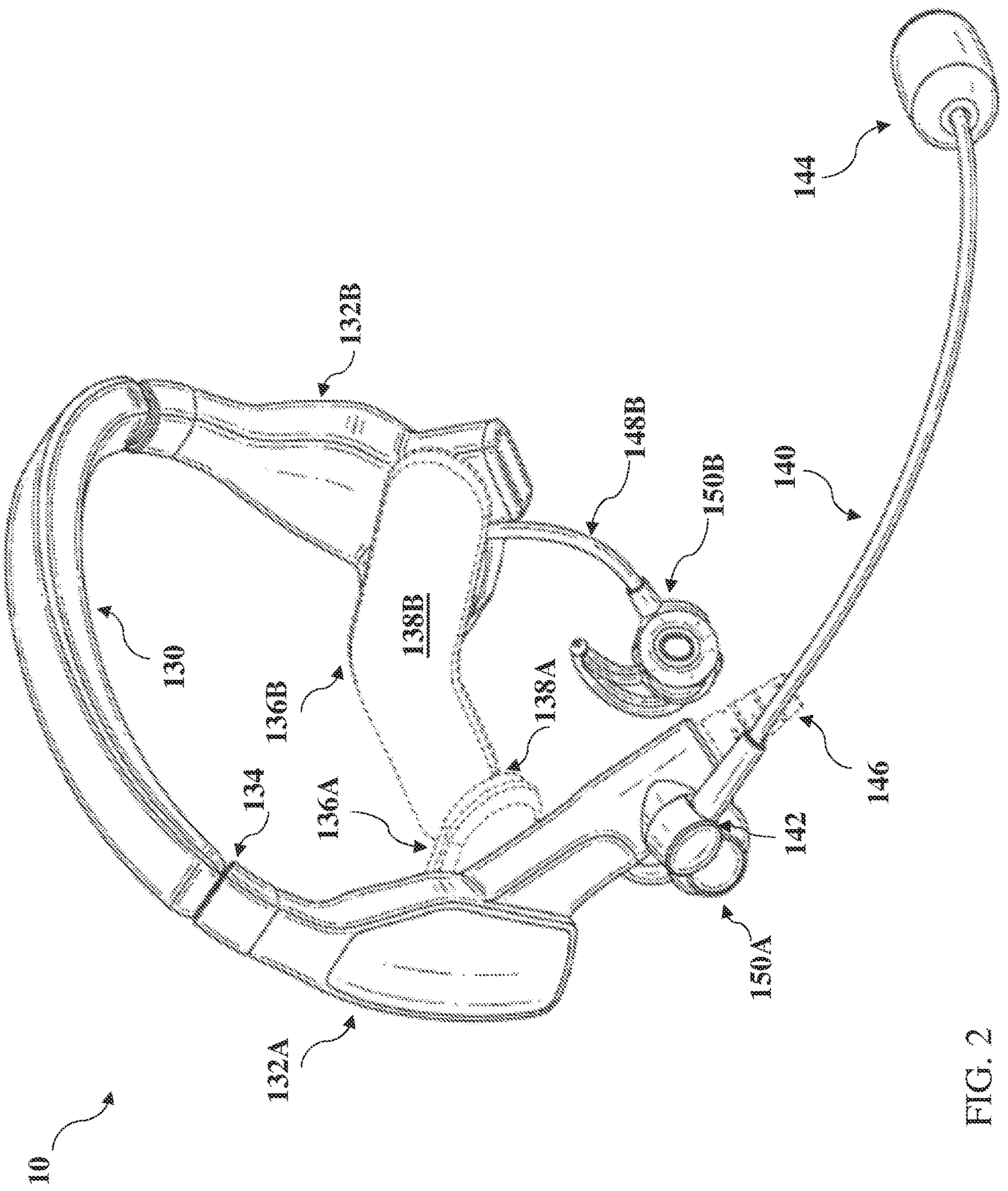
FIG. 2 is a schematic depiction of another audio device according to various implementations.

It is understood that the wearable audio devices 10 according to various implementations can take additional form factors. For example, FIG. 2 shows a wearable audio device 10 in the form of a personal communications headset 10 (e.g. an aviation headset). Reference numbers followed by an "A" or a "B" indicate a feature that corresponds to the right side or the left side, respectively, of the audio device 10. The audio device 10 includes a headband having an arcuate section 130, a right end and a left end. A right housing 132A and a left housing 132B are located at the right end and the left end, respectively, of the headband. The arcuate section 130 serves as an over-the-head bridge between the right and left housings 132. A spring band 134 (e.g., spring steel) extends from the right housing 132A, through the arcuate section 130 and to the left housing 132B. The spring band 134 provides a clamping force to move the housings 132 toward each other (approximately along a horizontal plane through the wearer's head) while the headband is worn by a user. The right and left housings 132 can be moved a distance either up and toward or down and away from the arcuate section 130 to accommodate a smaller or larger head, respectively.

A pad (right pad 136A or left pad 136B, generally 136) is attached to each housing 132 and is used to comfortably secure the headset 10 to the head. As used herein, a "pad" means a compliant member that can compress and/or deform under an applied pressure and that is configured for contact with the head of a user in a manner that supports the headband. In some cases, when the audio device (headset)

10 is worn on the head, each pad 136 extends from its forward end above the ear to its back end, which is lower on the head and behind the ear. In certain cases, the pads 136 each have a contoured surface 138 for contacting the head of the user. A boom 140 extends from a rotatable base 142 near the bottom of one of the housings (e.g., as illustrated, the right housing 132A) and is used to position and support a microphone 144 attached at the other end. The boom 140 may be adjusted, in part, by rotation about its base 142 to place the microphone 144 in proper position with respect to the mouth of the user. The boom 140 may be permanently affixed to the housing 132A or may be removable so that the audio device 10 can be used for both aviation and non-aviation uses (e.g., music playback). A connector 146 for a communications cable extends from the bottom of the right housing 132A. An earpiece (e.g., earbud) connector cable 148 extends at one end from each housing 132 and connects with an earpiece 150 such as an earbud or other type of in-ear headphone. Additional features of the audio device 10 in FIG. 2 are described in U.S. Pat. No. 10,187,718, which is entirely incorporated by reference herein.

Figure 3:
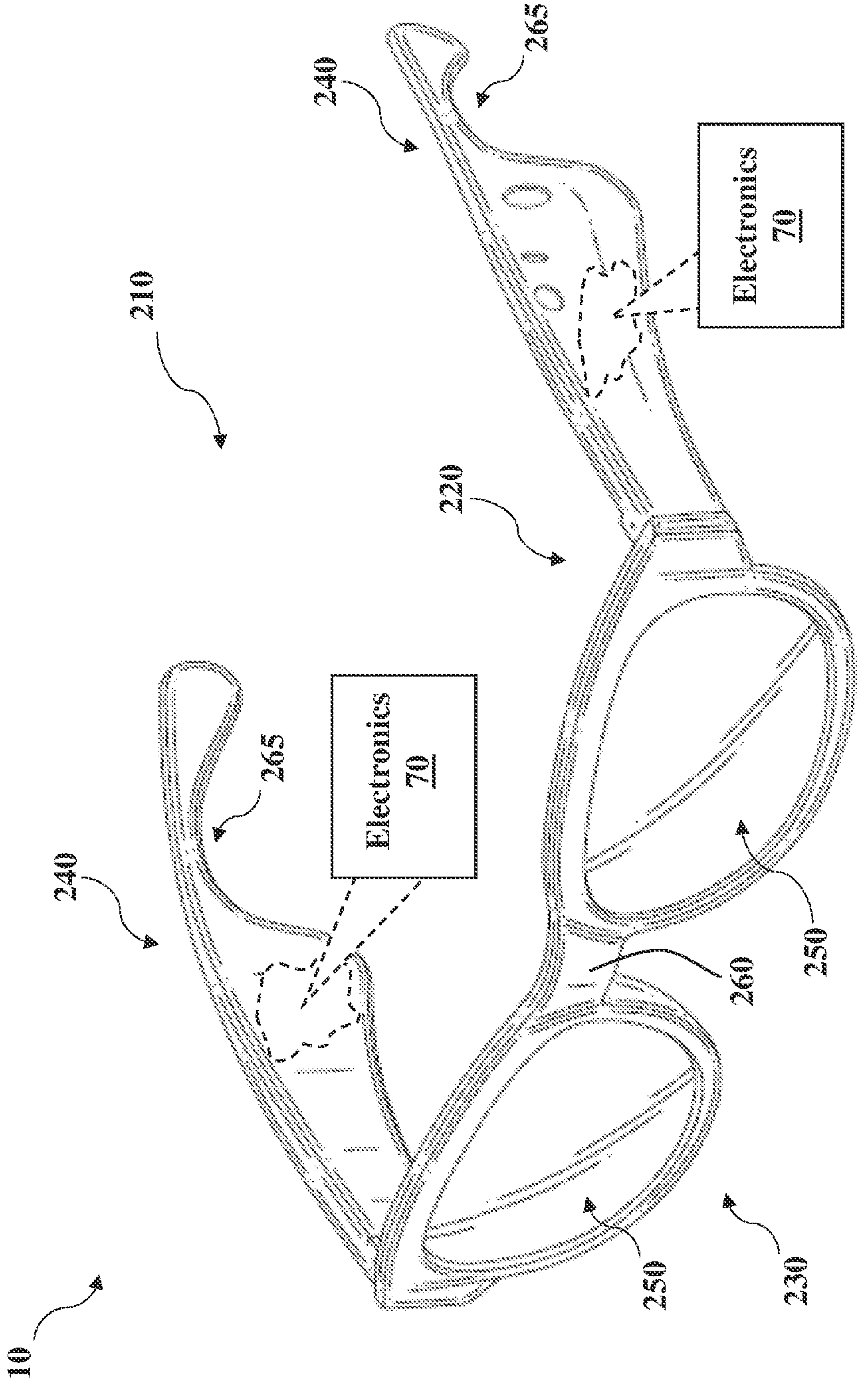
FIG. 3 is a schematic depiction of an additional audio device according to various implementations.

FIG. 3 illustrates an additional example audio device 10, including audio eyeglasses 210. As shown, the audio eyeglasses 210 can include a headband (e.g., frame) 220 having a lens region 230 and a pair of arms 240 extending from the lens region 230. As with conventional eyeglasses, the lens region 230 and arms 240 are designed for resting on the head of a user. The lens region 230 can include a set of lenses 250, which can include prescription, non-prescription and/or light-filtering lenses, as well as a bridge 260 (which may include padding) for resting on the user's nose. Arms 240 can include a contour 265 for resting on the user's respective ears. Contained within the frame 220 (or substantially contained, such that a component can extend beyond the boundary of the frame) are electronics 70 and other components for controlling the audio eyeglasses 210 according to particular implementations. Electronics 70 can include portions of, or connectors for, one or more electronic components as described with respect to the audio devices 10 herein. In some cases, separate, or duplicate sets of electronics 70 are contained in portions of the frame, e.g., each of the respective arms 240 in the frame 220. However, certain components described herein can also be present in singular form.

Figure 4:
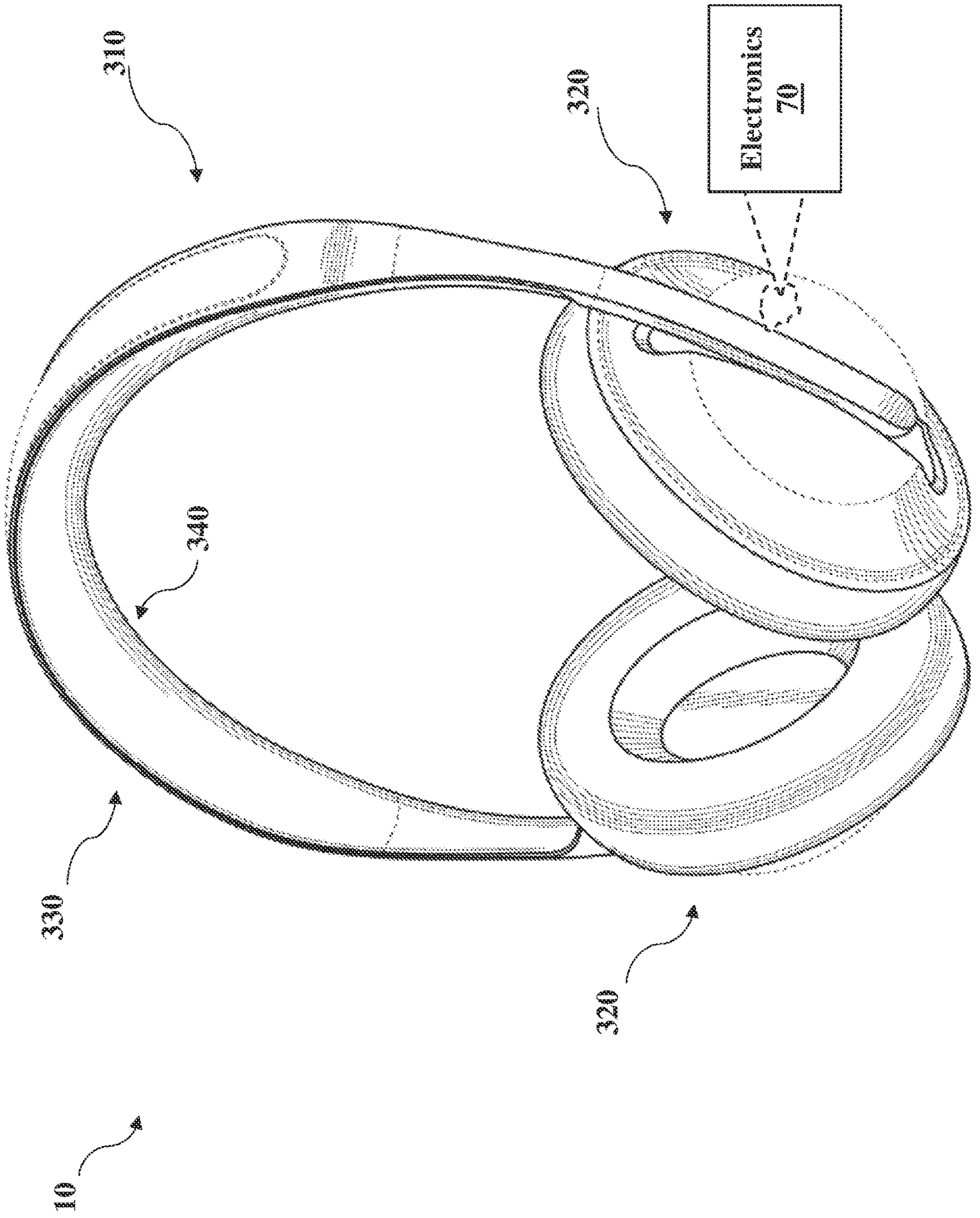
FIG. 4 is a schematic depiction of another audio device according to various implementations.

FIG. 4 depicts another audio device 10, including around-ear headphones 310. Headphones 310 can include a pair of earpieces (e.g., ear-cups) 320 configured to fit over the ear, or on the ear, of a user. A headband 330 spans between the pair of earpieces 320 and is configured to rest on the head of the user (e.g., spanning over the crown of the head or around the head). The headband 330 can include a head cushion 340 in some implementations. Stored within one or both of the earpieces 320 are electronics 70 and other components for controlling the headphones 310 according to particular implementations. Electronics 70 can include portions of, or connectors for, one or more electronic components as described with respect to the audio devices 10 herein. It is understood that a number of wearable audio devices described herein can utilize features of the various implementations, and the wearable audio devices 10 shown and described with reference to FIGS. 1-4 are merely illustrative.

Figure 5:
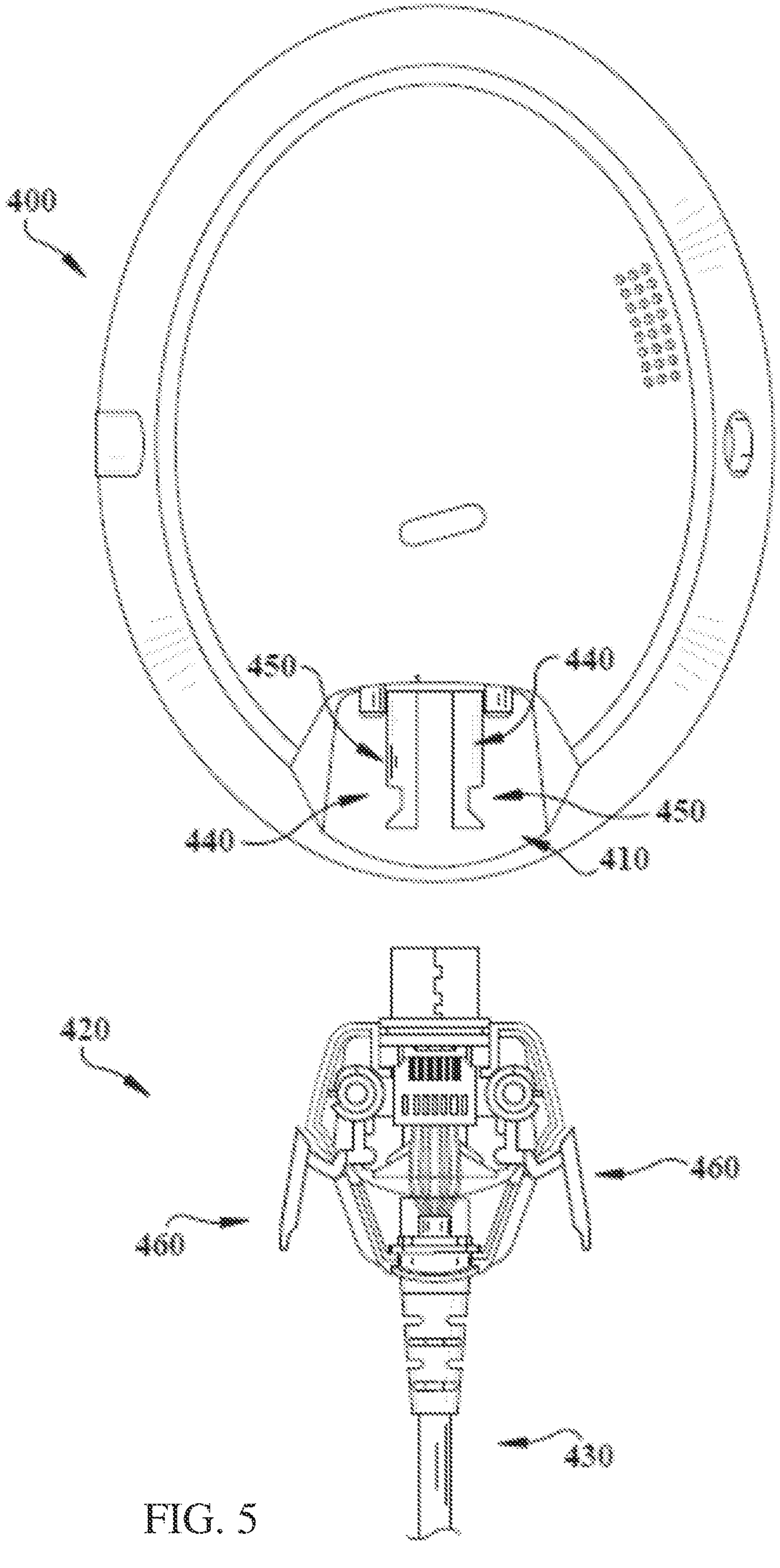
FIG. 5 is a side perspective view of a portion of an audio device and an accessory according to various implementations.

FIG. 5 shows a side view of an earpiece 400 in an audio device 10 according to various implementations. In some cases, the earpiece 400 includes an ear-cup such as the ear-cup 105 in the aviation headsets in FIGS. 1 and/or 2, or the ear-cup in the over-ear headset shown in FIG. 4. In other cases, the earpiece 400 can represent a portion of an in-ear, or near-ear earpiece that is configured to output audio to the ear of a user, e.g., in the arm 240 of audio eyeglasses shown in FIG. 3.

In this example implementation, the earpiece 400 includes an accessory port (e.g., slot) 410 configured to engage an accessory (e.g., an electronic component) 420. In this example, the accessory 420 includes a connector 430 such as a cable connector (e.g., cable connector 120 in FIG. 1). However, the accessory 420 can take any form capable of selectively engaging the earpiece 400. For example, in some cases, the accessory 420 includes: a boom microphone, a battery module, a power connector, a sensor module, a communications module (e.g., a wireless module, such as to enable Bluetooth or Wi-Fi, and/or a wired module), a self-powered communications module (e.g., self-powered Bluetooth module), and/or a microphone module. While one earpiece 400 is illustrate in various FIGURES herein, it is understood that both earpieces 400 in an audio device 10 can be equipped with an accessory port 410 for accommodating one or more accessories 420, e.g., for engaging the same type of accessory or distinct types of accessories.

In certain example implementations, the accessory port 410 includes at least one connector 440 for selectively engaging (e.g., coupling with) the accessory 420 and retaining the accessory 420 in contact with the earpiece 400. In certain implementations, the connector 440 includes one or more snap-fit and/or friction-fit connectors. In particular examples, each of the snap-fit connector(s) and/or friction fit connector(s) (or, "connector") 440 includes at least one fixed protrusion 450 within the port 410 that is sized to complement a moveable arm 460 in the accessory 420 in a locked position. In some examples, the connector 440 includes a plurality of fixed protrusions 450, e.g., a pair of fixed protrusions 450 illustrated in FIG. 5 for selectively engaging a pair of movable arms 460 in the accessory 420. Additional details of example accessory connections for an earpiece 400 are included in U.S. patent application Ser. No. 16/930,579 (Wearable Audio Device with Modular Component Attachment, filed on Jul. 16, 2020), which is incorporated by reference in its entirety.

The example accessory 420 in FIG. 5 can include any number of electronic components described herein. In some cases, the earpiece 400 forms an acoustic seal around the ear of a user, and/or around the entrance to the ear canal of a user. In certain cases, when connected with the earpiece 400 in the slot 410, the accessory 420 and the earpiece 400 are positioned to form an acoustic seal around the ear of the user. That is, in various implementations, when the accessory 420 is engaged with the earpiece 400 (e.g., in the locked position), they collectively seal the earpiece cavity. In certain implementations, such as where the audio device 10 includes noise cancelation/reduction capabilities, the acoustic seal around the user's ear can aid in noise cancelation functions. For example, the acoustic seal can aid in passive noise cancelation or reduction (PNC or PNR), and in some cases, can aid in active noise cancelation or reduction (ANC or ANR).

Figure 6:
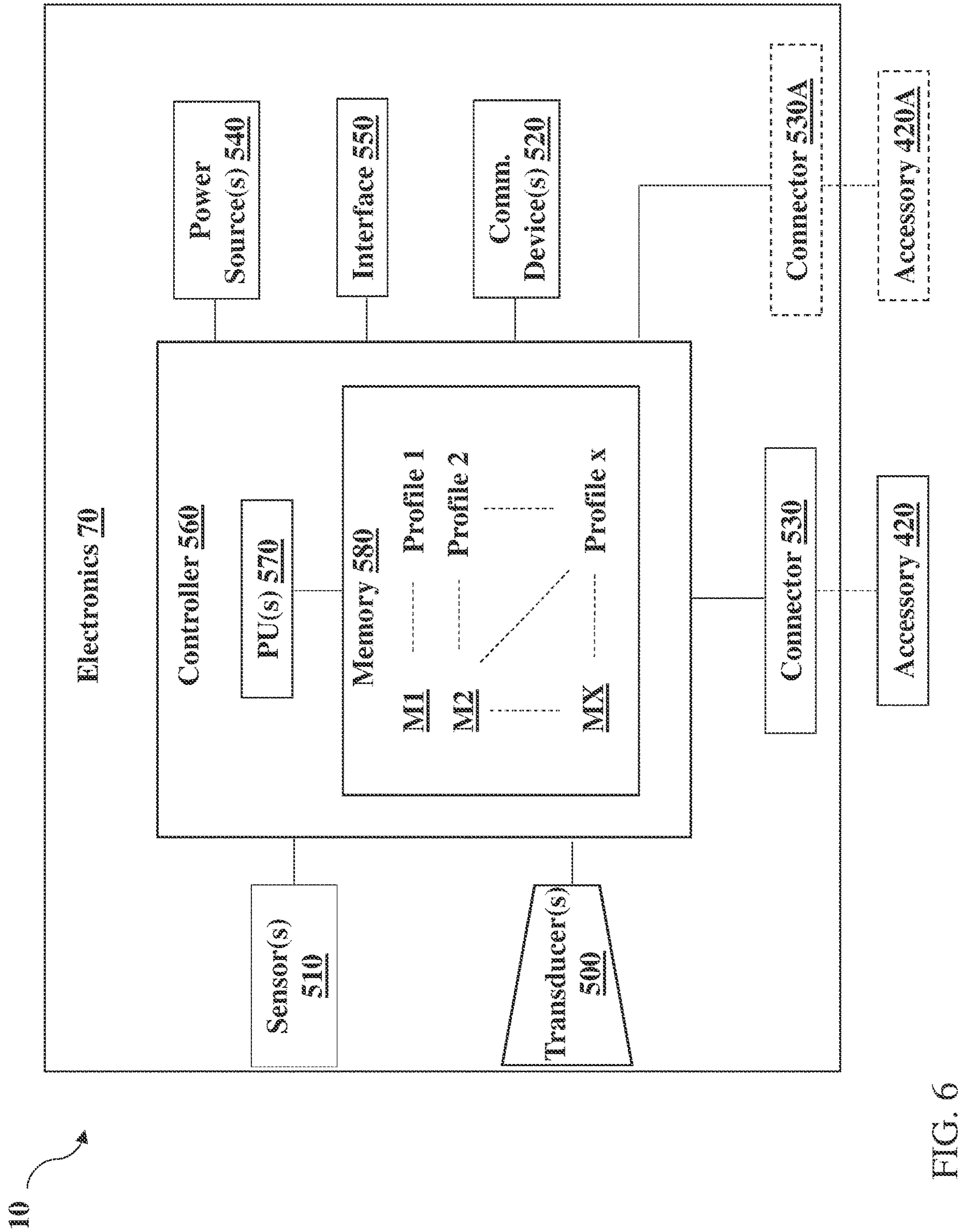
FIG. 6 is a schematic depiction of electronics included in an audio device according to various implementations.

FIG. 6 is a schematic depiction of example electronics 70 in a wearable audio device 10 according to various implementations. As described herein, in certain implementations, one or more components in electronics 70 can be located in a separate device (e.g., a smart device such as a smart phone, tablet computer, control module, electronic flight bag, etc.). Additionally, one or more functions performed by components in electronics 70 can be performed at a separate device from the wearable audio device 10, or duplicated at the separate device. In various particular implementations, each earpiece 400 (FIG. 5) includes separate electronics 70.

In any case, returning to FIG. 6, the electronics 70 can include at least one transducer 500 for providing an audio output. Electronics 70 can also include one or more sensors 510, such as location-based sensors (e.g., geo-location sensors), motion-based sensors (e.g., inertial measurement unit(s), or IMUs), optical sensors, one or more microphones (e.g., a microphone array), etc. Electronics 70 can also include one or more communication devices 520, such as one or more transmitters and/or receivers (e.g., wireless and/or hard-wired transmitters/receivers). In various implementations, the communication devices 520 are configured for a plurality of communication protocols, e.g., Bluetooth, BLE, Zigbee, etc., as well as radio communication and intercom communications. Electronics 70 can also include an accessory port connector 530 for detecting a connection (e.g., electrical and/or communication connection) with an accessory (e.g., accessory 420, FIG. 5). At least one power source 540 is shown (e.g., one or more batteries, charging devices and/or hard-wired power sources), along with an interface 550 (e.g., a user interface such as a touch screen, capacitive touch interface, gesture-detection interface, voice command interface, etc.).

The transducer(s) 500, sensors 510, communication device(s) 520, connector 530, power source(s) 540 and/or interface 550 can be connected with a controller 560, which in some cases, includes one or more processors (PU) 570 for performing functions described herein. The processor(s) 570 are coupled with memory 580 in various implementations. In some cases, functions of distinct processors 570 are performed in distinct controllers 560, which are not depicted. However, in other cases, the controller 560 can include one or more processors 570 for performing functions, e.g., as dictated by execution of instructions stored in the memory 580.

As described herein, the memory 580 can include multiple storage components (e.g., memory chips and/or chipsets), indicated by M1, M2, etc., which are configured to store instructions including profiles (e.g., Profile 1, Profile 2, etc.). In certain implementations, one or more profiles is stored in a particular memory (e.g., M1, Profile 1). In other implementations, a given profile is stored in multiple memory locations (e.g., M2, MX), or multiple memory locations (M2, MX) have access to the same profile. Profiles can be reviewed, selected, customized or otherwise edited via one or more interfaces described herein. In certain implementations, profiles can be reviewed, selected, customized or otherwise edited with an application (e.g., software application) running on a computing device coupled with the wearable audio device 10. In particular examples, a software application running at a connected smart device enables a user to review, select, customize or otherwise edit profiles, e.g., as described in U.S. patent application Ser. No. 16/165,055 (Conversation Assistance Audio Device Personalization, filed Oct. 19, 2018), which is incorporated by reference in its entirety.

In certain cases, profiles can include configurations for noise cancellation, hear-through, equalization (EQ), sensor configuration, etc. For example, profiles can include one or more configurations for controlling operation of hardware and/or software components in the audio device 10. In certain implementations, the profiles include configurations, or configuration groups, that define settings for at least one of the following:

A) Default and/or customized active noise reduction (ANR) and/or controllable noise cancellation (CNC). For example, configurations can define feedforward and/or feedback filters, threshold volume levels such as high/medium/low, etc. Configurations can also adjust settings for various user-adjustable levels of ANR, such as assigning different ANR settings for two or more favorite settings (e.g., high/medium/low or transparency). Moreover, the number of favorite settings can be adjusted, such as only having full ANR and transparency mode when a first accessory is connected to the audio device 10 but having high, medium, low, and transparency mode favorites when a second accessory is connected to the audio device 10.

B) Hear-through (or, transparency) mode, e.g., how much ambient noise is permitted to play through transducers 500 and be perceived by the user. For example, in an aviation setting such as where the audio device 10 is used by an aircraft pilot, or in a sporting event setting such as where the audio device 10 is used by a coach or other member of a sporting team, the audio device 10 can permit adjustment of ambient noise hear-through based on detected environmental noise level. For instance, the hear-through or transparency properties could be adjusted to increase accuracy (e.g., to try to best simulate what the environment sounds like), to increase intelligibility (e.g., to only or primarily allow sounds through that are in the voice band but to cancel other frequencies, such as low frequencies from an aircraft or other vehicle).

C) Equalization (EQ), e.g., adjusted according to one or more parameters such as a type of audio source and/or based on the specific input source(s). For example, EQ settings can be varied based on a type of audio source, e.g., a first EQ setting to enhance voice intelligibility for communication-based audio (e.g., radio communication, intercom) and a second EQ setting to enhance music clarity for Bluetooth music playback. Such an example may determine the EQ to apply based on the input of the audio source. For instance, if audio is being received from an intercom connection to an airplane, then a first EQ setting is applied (e.g., to enhance voice intelligibility), and in response to the audio being received from a different source, such as from a Bluetooth audio source, a second EQ setting can be applied (e.g., to enhance musical clarity and/or user preferences for audio playback).

D) Microphone settings (e.g., for one or more microphones in sensors 510, or separate microphones in the audio device 10. For example, the profiles can dictate microphone settings such as pickup sensitivity, self-voice detection, sidetone and/or exclusion.

E) Sensor configurations (e.g., for one or more sensors 510). In these cases, profiles can dictate which sensors are active versus inactive (e.g., IMU, optical sensor, microphone array), as well as which sensor inputs to prioritize and/or weight in making a processing decision (e.g., verify a movement detected using the IMU with an optical sensor).

F) Wind control. For example, profiles can dictate the sensitivity of one or more microphones (e.g., in sensors 510), such as feedforward microphone(s), to windy environments.

G) Overload management. For example, the profiles can dictate whether to adjust noise reduction/cancelation settings based on a detected ambient noise level approaching or exceeding a prescribed threshold (e.g., as described in U.S. patent application Ser. No. 16/788,365 (Computational Architecture for Active Noise Reduction, filed on Feb. 12, 2020), which is incorporated by reference in its entirety).

H) Comfort attributes. For example, profiles can dictate whether one or more heating and/or cooling elements is activated in the audio device 10 or another device in communication with the controller 560.

I) Power management settings. For example, profiles can dictate when to automatically power down the audio device 10 and/or reduce power usage to preserve battery life.

J) Accessory-based settings. For example, profiles can dictate which functions, and corresponding settings, apply to a type of accessory (e.g., accessory 420, FIG. 5) that is connected with the audio device 10.

K) Audio playback settings. For examples, profiles can dictate which audio playback to permit (e.g., particular sources of audio content being permitted, while others are blocked) at certain times or under certain conditions. Additionally, audio playback settings can define volume levels for audio playback, which can vary by type of audio (e.g., music is at a lower volume than a notification or communication, which are distinct from telephone call audio). Further, audio playback settings can define whether, and which type of, audio notifications can interrupt current audio playback.

L) User input settings. For example, profiles can dictate whether hardware control features are enabled or disabled, and if enabled, what function the hardware control features perform. Such hardware control features could include one or more buttons, switches, sliders, knobs, joysticks, directional pads, keyboards, keypads, on-head detectors (e.g., using proximity sensors), touch surfaces (e.g., capacitive or resistive), accelerometers, gyroscopes, inertial measurement units, ANR engine-based tap controls, and/or any other means for providing input. By way of illustration, a button on the headset may be used, e.g., to access a virtual personal assistant (VPA) when the headset is in a consumer or lifestyle profile, but that same button may be automatically switched to a different function when the headset enters an aviation profile (e.g., as a result of connecting an aviation accessory to the headset or based on user input), where that different function could be, e.g., toggling through different audio prioritization modes, such as a first mode that enables mixing Bluetooth audio with intercom audio and a second mode that enables intercom transmissions to temporarily mute Bluetooth.

It is understood that any number of settings, profiles, or groups of profiles (e.g., "pages"), can be saved for retrieval in memory 580 and/or a remote memory. In these cases, profile groups and/or sub-groups can be use-specific, industry-specific, accessory-specific, etc. Additionally, ANR configurations can be pre-selected and/or pre-grouped in "banks" based on the pages. In some cases, pages and banks are saved in memory 580 on a particular audio device 10, and the controller 560 enables switching between ANR configurations within a given bank, which can vary based on profile.

As noted herein, the controller 560 can be configured to perform active noise reduction (ANR) and/or controllable noise cancellation (CNC) functions to manage the level of ambient noise that is heard by the user of the audio device 10. These conventional processes, which include adjusting output at the transducer(s) 500 based on signals detected at feedforward and feedback microphones (e.g., in sensors 510) are not described in further detail. Additional general description of noise reduction and/or cancelation is included in U.S. patent application Ser. No. 16/788,365 previously incorporated by reference in its entirety.

Returning to FIG. 6, in certain example implementations, the processor 570 is configured to execute instructions from memory 580 to select a first ANR configuration (e.g., Profile 1, Profile 2, etc.) upon powering on the audio device 10. In particular cases, the processor 570 is configured, in response to the power-up command (e.g., via interface 550), to select the first ANR configuration based on an accessory 420 (FIG. 5) connected to the accessory port 410 (FIG. 5), e.g., as detected at connector 530. That is, in response to the power-up command, the processor 570 is configured to detect the presence, and type, of an accessory 420 connected via the connector 530. In some cases, the accessory 420 includes an identifier, and the processor 570 is further configured to read the accessory identifier prior to selecting the first ANR configuration. In some implementations, the processor 570 reads multiple identifiers, such as an identifier from each accessory 420 connected to each port of the audio device (e.g., ports 410A and 410B in FIGS. 7 and 8) and/or from identifiers of multiple components connected to a single port (e.g., reading both a control module identifier and a microphone identifier connected in the same or distinct accessories 420 to port 410A in FIG. 7*a*). Additionally, in various implementations, the processor 570 is configured to automatically switch to a second ANR configuration (e.g., Profile 2, Profile 3, Profile X, etc.), that is distinct from the first ANR configuration, in response to a trigger.

In certain cases, first ANR configuration is the same as an ANR configuration that is used prior to powering on the audio device 10. That is, the first ANR configuration can be the same as the last ANR configuration used prior to the last power-down of the audio device 10. In various implementations, the second ANR configuration is user-customizable. For example, one or more users can select particular settings of the second ANR configurations. These settings can include any applicable settings described herein, with particular examples including feedforward and/or feedback filters, threshold volume levels, hear-through, etc. As noted herein, the first and second ANR configurations vary, such that at least one setting is different in the first ANR configuration as compared with the second ANR configuration. In some aspects, the first and second ANR configurations include different filter coefficients.

As noted herein, the audio device 10 can be configured to connect with a variety of accessories. For example, the accessory 420 (FIG. 5) can include a power source. In other cases, the accessory 420 includes a cable (e.g., connector cable) configured to attach the audio device 10 to at least one other device (e.g., electronic flight bag, external sensor module, etc.). In still other implementations, the accessory 420 includes a microphone or an array of microphones. In some implementations, the accessory 420 includes one or more image capture devices, such as a camera. In some implementations, the accessory 420 includes one or more light capture devices, such as one or more photodectors, lidar sensors, or opto-electronic devices (e.g., for scanning or transmitting/receiving). In some such implementations, the one or more image capture devices could be used for head-tracking purposes, such as to be used to help provide a home/default/reset position. In some implementations, the accessory 420 includes a positioning system, such as a global positioning system (GPS), local positioning system, or indoor positioning system. In certain examples, the accessory 420 includes a sensor module that is configured to sense user biometric data (e.g., heart rate, perspiration, glucose level, blood oxygen level/oxygenation, temperature, eye movement, eye blink rate, breathing rate, oxygen consumption levels, etc.), degree and/or characteristics of user motion (e.g., via IMU-type sensors and/or optical sensors), and/or an environmental characteristic (e.g., ambient noise characteristics, ambient light characteristics, pressure characteristics, humidity, temperature, altitude, directional heading, oxygen levels, etc.). For example, one or more sensors could be used to determine alertness/attentiveness of the user, such as analyzing user motion and/or analyzing biometric data (e.g., eye blink rate, breathing rate). This could be performed to help detect whether the user is getting tired or sleepy. As another example, an ambient light sensor could be used to control the on-device lighting, such as to determine whether to enable or disable certain lighting or whether to dim certain lighting. In still other examples, the accessory 420 connects to at least one sensor that is remote from the audio device 10, e.g., an environmental sensor such as a pressure sensor, or a biometric sensor such as a heart rate monitor. In certain cases, the accessory 420 provides a hard-wired connection to the remote sensor. In other cases, the accessory 420 provides a wireless connection (e.g., via a transmitter/receiver) to the remote sensor. Note that the sensors variously described herein could, in some implementations, be included in or on the audio device 10, such that they do not need to also be included in a connected accessory. Further note that in some implementations, one or more of the sensors variously described herein is not carried by audio device 10, but instead, the one or more external sensors provide data to audio device 10 for use, such as via a wired or wireless connection, a mobile device application, an electronic flight bag (EFB), or some other suitable manner as can be understood based on this disclosure.

In some cases, the audio device 10 further includes another accessory port, e.g., two or more accessory ports such as the accessory port 410 illustrated in FIG. 5. In certain cases, the additional accessory port is located in a distinct section of the audio device 10 (e.g., in a distinct earpiece 400), or in the same section as the first accessory port 410 (e.g., in the same earpiece 400). FIG. 6 illustrates an additional connector 530A coupled with the additional port 410A, which enables connection with an additional accessory (e.g., similar to accessory 420). According to some implementations, the first accessory 420 includes a power source or a connection to a power source, and power from the first accessory 420 is passed through the audio device 10 to the other accessory port to provide power to another accessory 420A (illustrated in phantom as optional). In these cases, the first accessory 420 can provide power for the audio device 10 and/or the additional accessory 420A. For instance, a single rail power supply may be used (e.g., using any voltage from 1.8V to 5V), thereby providing flexibility for power sources that could be used. Such single rail power supply implementations allow power to be passed from one accessory port to at least one other accessory port to power one or more other accessories connected to the at least one other accessory port of audio device 10. In addition, use of a single rail power supply can eliminate the need for a control module connected to audio device 10, such as for various headset applications. This is notable for use cases including, but not limited to, aviation, broadcast, and military, as the control module of headsets in those fields currently include an external control module connected to the headset to provide and/or manage power to the headset (examples include the A20 and ProFlight Aviation Headsets that are both sold by Bose Corporation). Thus, as audio device 10, in at least some implementations, includes an internal control platform that is capable of receiving numerous different power sources, thereby removing the need for an external control module. Such power sources could include one or more battery packs supporting different battery types and/or voltages, a cable connection to a Universal Serial Bus (USB) port, and/or a cable connection to a vehicle, to name a few examples. In certain implementations, the first accessory 420 is the primary power source (or connection to the primary power source) for the audio device 10, e.g., such that the audio device is not powered unless connected with the first accessory 420. For example, the first accessory 420 can include a down-cable connection to an aircraft power system and/or batteries in an aircraft control module. In still other cases, the first accessory 420 (or other accessory 420 connected with the audio device 10) contains a power source such as a battery, which may or may not be rechargeable. In still further cases, the audio device 10 can include its own power source (e.g., such as power source 540), which can include a battery that may or may not be rechargeable. In certain implementations, where the power source 540 includes an on-board battery contained in the audio device 10, that power source 540 can be supplemented by power from the accessory 420 (where applicable), and/or can be recharged by power received from the accessory 420.

Figure 7:
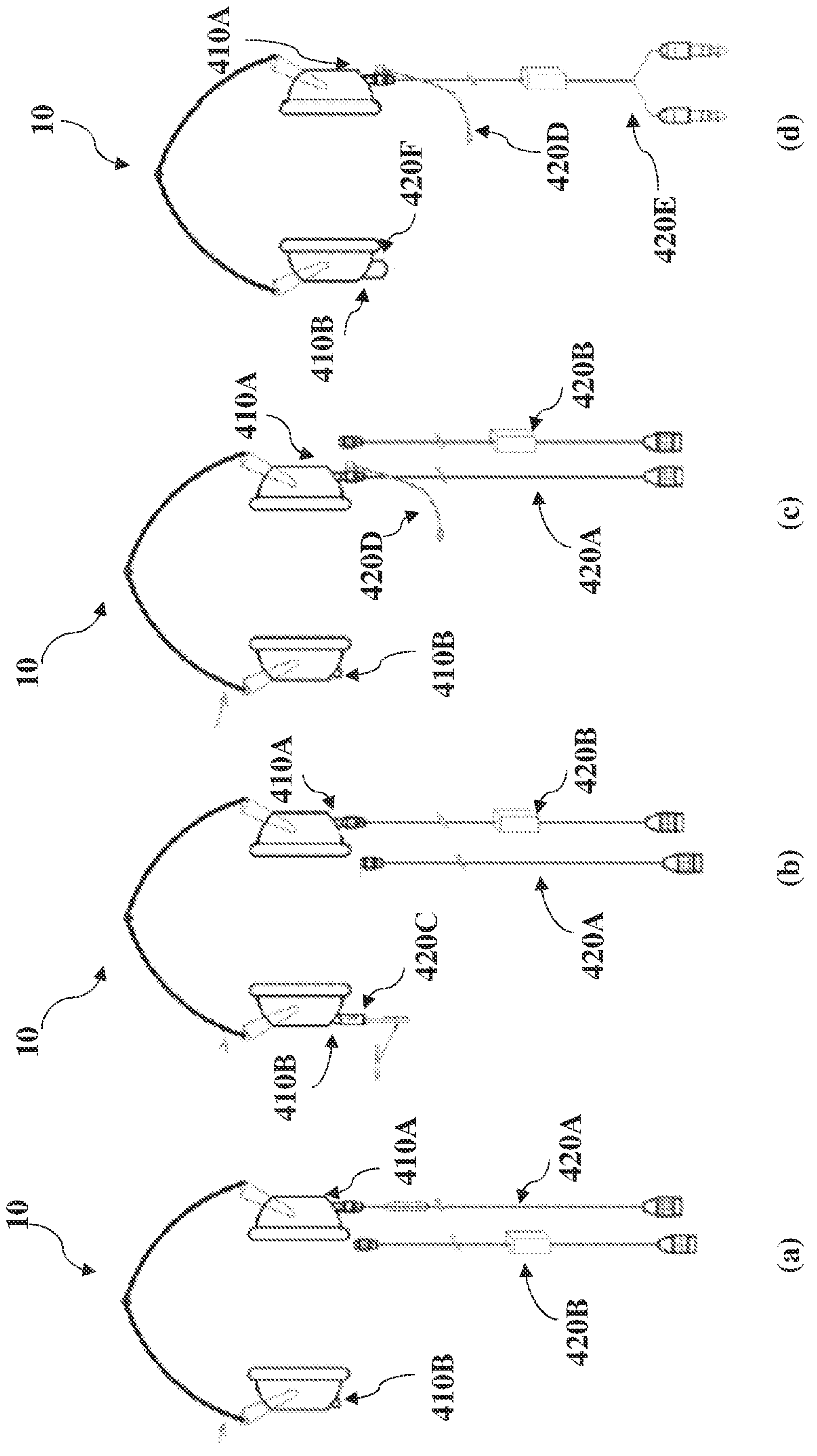
FIG. 7 is a schematic depiction of accessory configurations for an audio device according to various implementations.

FIG. 7 depicts four non-limiting examples of variations on an audio device 10 according to various implementations, with focus on ports 410 for connecting accessories 420. In some implementations, the audio device 10 includes one or more ports 410 (e.g., two distinct ports) for coupling with a plurality of accessories 420. In example (a), the audio device 10 is shown coupled at a first port 410A to a first accessory 420A including an intercom system (ICS) connector. In certain cases, the ICS connector also includes a power source/connector for providing power to the audio device 10. However, in other cases, the audio device 10 is configured to connect with an external power source at another port, e.g., second port 410B. In certain cases, the first accessory 420A can be exchanged with a second accessory 420B, which in some cases such as depicted in example (a), includes a battery power connector. Example (a) further depicts a scenario where the ICS connector (first accessory 420A) is not connected with a boom microphone. Example (b) shows the audio device 10 coupled with a battery power connector (second accessory 420B) at a first port 410A, and additionally coupled with another accessory (e.g., third accessory 420C) that includes a microphone (or microphone array) at the second port 410B. In some cases, as described herein, the battery power connector 420B, through the audio device 10, powers the microphone or microphone array 420C at the second port 410B. As with example (a), the distinct accessories (e.g., ICS connector, 420A) can be coupled with the first port 410A in different usage scenarios. It is understood that these distinct accessories can also be configured to couple with the second port 410B and/or an additional port (not shown). Example (c) shows the audio device 10 coupled with the ICS connector (first accessory 420A), along with a boom microphone 420D, at port 410A. In this example, the second port 410B is not coupled with an accessory. As with examples (a) and (b), the distinct accessories (e.g., battery power connector, 420B) can be coupled with the first port 410A in different usage scenarios. In certain of these usage scenarios, the boom microphone 420D can remain coupled with the first port 410A along with the accessories 420A, 420B. Example (d) shows the audio device 10 coupled with a combined battery and communications module 420E, along with a boom microphone 420D, at port 410A. In this example, a sensor module 420F is also coupled with the second port 410B. In these cases, as described herein, the combined battery and communications module 420E, through the audio device 10, can power the sensor module 420F. In other cases, the sensor module 420F includes a battery or otherwise draws power from a battery on board the audio device 10. It is understood that the accessories 420 depicted in FIG. 7 are merely some of the many accessories that can be coupled with the audio device 10 according to various implementations. Additionally, any technically feasible combination of accessories 420 can be coupled with distinct ports 410 in the audio device 10 to enable desired functionality. For example, one or more distinct types of microphones, e.g., boom microphone, single microphone, microphone arrays, etc. can be coupled to distinct ports 410 in the audio device 10 to enhance voice pickup and/or communication functions.

Figure 8:
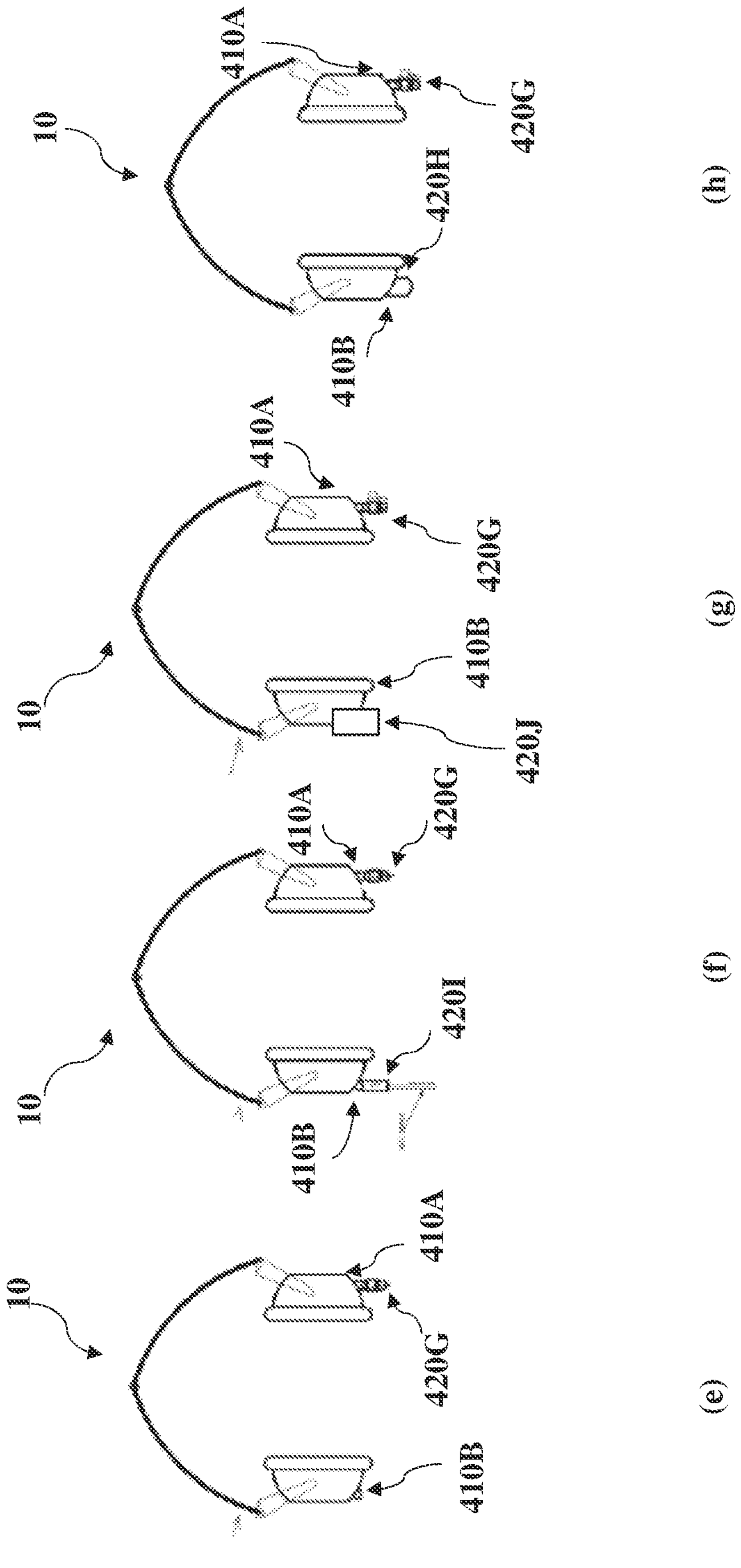
FIG. 8 is a schematic depiction of accessory configurations for an audio device according to various additional implementations.

FIG. 8 depicts four non-limiting additional examples of variations (e)-(h) on an audio device 10 according to various implementations, with focus on ports 410 for connecting accessories 420. As noted with respect to FIG. 7, in some implementations, the audio device 10 includes one or more ports 410 (e.g., two distinct ports) for coupling with a plurality of accessories 420, such as wireless accessories. In these cases, accessories 420 can include a battery pack 420G (e.g., in variations (e)-(h)), a sensor module 420H (e.g., in variation (h)), a microphone module (e.g., one or more microphones for voice pickup) 4201 (e.g., in variation (f)), and an interface connector (e.g., having one or more control features such as buttons or a capacitive touch interface) 420J (e.g., in variation (g)). In some cases, an accessory 420 can include one or more of these components (e.g., battery pack, sensor module, microphone module and/or interface connector). In certain examples, a single accessory 420 can include a battery pack, a motion/position sensor (e.g., an IMU), a microphone array and an interface connector for enabling wireless, independent functionality of the audio device 10. Note that although audio device 10 is primarily described herein as having two accessory ports, the present disclosure is not intended to be so limited. Therefore, in some implementations, audio device 10 includes only one accessory port, three accessory ports, four accessory ports, or any number of accessory ports. Further, in some implementation, audio device 10 does not have any accessory ports, but still includes one or more of the features described herein.

As described herein, the processor 570 can be configured to switch ANR configurations in response to a variety of triggers. For example, in certain cases, the trigger includes disconnecting the accessory 420 (FIG. 5) from the accessory port 410 (FIG. 5). In these cases, in response to detecting that the accessory 420 is no longer coupled with the connector 530 (at accessory port 410), the processor 570 automatically (i.e., without an additional trigger or condition) switches from the first ANR configuration to the second ANR configuration. These cases can be applicable in scenarios where the accessory 420 does not function as the sole, or at least the primary, power source for the wearable audio device 10. That is, in certain cases such as in aviation-specific uses, disconnecting the accessory 420 removes the primary power source for the wearable audio device 10. In those cases, the processor 570 can be configured to disable ANR functionality (which inherently requires power), and/or to power down the wearable audio device 10 instead of switching ANR configurations. In other cases, such as where sufficient power is available at the wearable audio device 10 to support ANR functionality without the accessory 420 (e.g., power source 540 (FIG. 6) is an on-board battery, or an additional power source 540 is coupled with the wearable audio device 10), the processor 570 is configured to automatically switch from the first ANR configuration to the second ANR configuration in response to detecting decoupling of the accessory 420.

In still further implementations, the trigger includes connecting another (distinct) accessory 420A to the accessory port 410 (FIG. 5), e.g., at the same connector 530 (FIG. 6). In additional implementations, the trigger includes connecting another (distinct) accessory 420A to an additional accessory port 410 in the audio device 10 (e.g., at connector 530A in a distinct section of the audio device 10). In certain cases, the processor 570 is configured to switch ANR configuration in response to detecting a connection with another accessory 420. In these examples, the processor 570 is configured to switch to an additional ANR configuration (e.g., a second, third, fourth, etc. configuration) in response to detecting an accessory connection (e.g., via connector(s) 530), e.g., after a previously connected accessory 420 has been disconnected (e.g., via connector 530) or at a distinct accessory port 410 in a distinct section of the audio device 10.

In particular cases, upon power-up, the processor 570 selects the first ANR configuration based on a first accessory 420 connected at that time, switches to the second ANR configuration in response to detecting that the first accessory 420 is disconnected, and switches to a third ANR configuration in response to detecting that a second, distinct accessory 420 is connected (e.g., via connector 530). These cases may be particularly applicable where the first accessory 420 is not the sole power source (e.g., down-cable, battery connector, etc.) for the audio device 10. For example, where the audio device 10 has sufficient on-board power such as battery power and/or is coupled with another power source (e.g., at an additional connector), then disconnection of a first accessory 420 and replacement with an additional accessory 420 can trigger transition between up to three ANR configurations. As noted herein, in various implementations, accessories 420 can also function as power sources, alone or in addition to other functions. For example, a Bluetooth, BLE or other wireless communication accessory can include a battery module that supports its own wireless communication functions and/or provides backup power to the controller 560.

In other particular cases, upon power-up, the processor selects the first ANR configuration based on a first accessory 420 connected at that time, maintains the first ANR configuration after disconnection of the first accessory 420, and switches to the second ANR configuration in response to detecting that the second, distinct accessory is connected (e.g., via connector 540). That is, in various implementations, disconnecting and/or connecting an accessory (e.g., accessories 420) can act as a trigger for adjusting an ANR configuration.

In additional particular cases, after disconnecting an accessory (e.g., a first accessory 420) from a first accessory port 410, the user may elect not to couple an additional accessory 420 to the first accessory port 410 for some period but otherwise continue to use the audio device 10. In these cases, the processor 570 can be configured to switch from the first ANR configuration to a second ANR configuration in response to disconnection of the first accessory 420, and remain in the second ANR configuration for that period. In certain of these cases, the audio device 10 can be used for distinct purposes, and/or with the benefit of distinct ANR configurations. One particular example related to aviation is "dead-heading", where a pilot using the audio device 10 as an aviation headset can disconnect a first accessory 420 such as a down-cable or EFB connector in order to use the audio device 10 outside of the aviation context, e.g., while walking through the airport, or traveling as a passenger on another flight. In these cases, disconnecting the first accessory 420 can trigger the processor 570 to switch from a first ANR configuration (e.g., aviation-compliant configuration with narrow audio spectrum tailored for intercom communication) to a second ANR configuration (e.g., music or configuration with a wider audio spectrum such as a recording studio configuration). In certain of these cases, the processor 570 is configured to switch to battery or secondary power after disconnection of the first accessory 420, and in particular cases, the processor 570 switches to an ANR configuration that requires less power in order to conserve battery power.

In other cases, e.g., where the first accessory 420 is the primary power source for the audio device 10 (e.g., down-cable, battery connector, etc.), disconnecting that first accessory 420 triggers the processor 570 to power down the audio device 10 as described herein. In still further cases, the audio device 10 can include more than one controller 560 and associated processor 570, which enables adjustment of ANR configurations based on accessories coupled to distinct ports 410.

In still further implementations, such as where multiple accessories 420 are coupled to the ports 410, the controller(s) 560 are configured to select and/or adjust ANR configurations based on priority. For example, priority can be dictated by a first-in-first-out (FIFO) scheme, a last-connected scheme, or an accessory hierarchy scheme (e.g., where a particular type of accessory has priority over a distinct type of accessory for dictating ANR configuration).

In still further implementations, the trigger includes selection of the second ANR configuration by a user. For example, the processor 570 can be configured to switch from the first ANR configuration to the second ANR configuration based on a user command (e.g., via interface 550 and/or sensors 510, FIG. 6). In these cases, the user can effectively switch between ANR configurations based on preference with one or more convenient commands, e.g., touch command, gesture-based command, voice command, etc. In specific examples, the audio device 10 includes a mechanical switch for modifying ANR configurations. In certain of these examples, the mechanical switch includes at least two positions, where the processor 570 is configured to switch between ANR configurations (e.g., from first to second ANR configuration, or from second to third ANR configuration) in response to manipulation of the mechanical switch.

In particular examples, the user can select one or more ANR configurations (along with one or more other settings from profiles, as well as between profiles themselves) via a computing device application, e.g., via a smart device connected with the audio device 10. In these cases, the audio device 10 can be coupled with a smart device such as a smart phone, tablet computer, control module, electronic flight bag, etc., and can be configured to process user commands made in a computing device application, such as at an interface at the smart device. In still further implementations, the interface 550 at the audio device 10 can comprise a touch interface, button, switch, or other physical interface for selecting, or switching between ANR configurations. In certain implementations, the interface 550 can include a mechanical switch such as a two-position or three-position switch enabling a user to command the processor 570 to switch between profiles, ANR configurations and/or other settings. In some examples, the interface 550 includes a mechanical switch enabling a user to switch between at least two ANR configurations. For example, the mechanical switch enables switching between one use-specific ANR configuration (e.g., an aviation-specific ANR configuration) and another use-specific ANR configuration (e.g., a broadcast-specific ANR configuration or music playback-specific ANR configuration).

As noted herein, ANR configurations can be part of profiles (e.g., Profile 1, Profile 2, etc.) that define one or more settings for the audio device 10 (e.g., one or more of settings (A)-(L) described herein). In particular implementations, the first ANR configuration is a component of a first profile (e.g., Profile 1), and the second ANR configuration is a component of a second profile (e.g., Profile 2). In these cases, selecting the first ANR configuration includes selecting the first profile (e.g., Profile 1), and automatically switching to the second ANR configuration includes automatically switching to the second profile (e.g., Profile 2). According to some implementations, the profiles differ in more than just ANR configuration. For example, as noted herein, Profiles can include ANR settings, hear-through settings, equalization (EQ) settings, microphone settings, overload management settings, power management settings, etc. In certain implementations, a first profile (e.g., Profile 1) has a first ANR configuration (e.g., setting group (A)), and a first additional setting configuration (e.g., hear-through in setting group (B), EQ in setting group (C), overload management in setting group (G), power management in setting group (I), and/or audio settings in setting group (K)). In these implementations, the second profile (e.g., Profile 2) has a second ANR configuration (e.g., setting group (A)), and a second additional setting configuration (e.g., hear-through in setting group (B), EQ in setting group (C), overload management in setting group (G), power management in setting group (I), and/or audio settings in setting group (K)) that differs from the first additional setting configuration. For example, Profile 1 can have a first ANR configuration that includes a first set of filter coefficients for processing ambient noise, as well as a first additional setting configuration that includes a first power management setting for operation of the audio device 10. In these cases, the first power management setting defines a first power saving procedure in the case that external power to the audio device 10 is disconnected or battery power drops below a threshold level. Profile 2 has a second, distant ANR configuration that includes a second set of filter coefficients for processing ambient noise, as well as a second additional setting configuration that includes a second power management setting for operation of the audio device 10. In these cases, the second power management setting defines a second power saving procedure in the case that external power to the audio device 10 is disconnected or battery power drops below a threshold level. For example, the second power management setting can switch to a low-power mode more quickly than the first power management setting in order to conserve power for a number of functions. In contrast, the first power management setting can remain in standard-power mode longer to enable more responsive ANR functionality (i.e., higher ANR performance).

In particular examples, the ANR configurations can vary in terms of ANR performance, e.g., the ability to effectively reduce ambient noise heard by the user. In certain cases, the processor 570 is configured to switch between the ANR configurations to manage overload events, or otherwise prevent overload events, at the transducer(s) (driver(s)) 500. For example, the second ANR configuration can include relatively lower ANR performance than the first ANR configuration. In these cases, in response to detecting an ambient noise level that exceeds a threshold, the processor 570 can be configured to switch from the first ANR configuration to the second ANR configuration, e.g., to avoid an overload event at the transducer 500. For example, as noted herein, the processor(s) 570 can include one or more ANR components such as an ANR circuit for managing noise reduction and/or cancelation according to the ANR configuration. However, because ANR functionality is related to power output, the ANR components may not be suited to completely exclude all ambient noise. For example, the ANR components (e.g., ANR circuit) may not be capable of completely excluding a sudden, loud ambient noise without overloading the transducer(s) 500. As such, it can be desirable to manage the ANR response to these sudden, loud noises. In certain implementations, the processor 570 is configured to measure the ambient noise level using the feedforward microphone signal path (e.g., from microphones) and/or the power consumption of the feedback loop to transducer(s) 500 in order to avoid overloading the driver 500 with an ANR response. In some cases, the processor 570 continuously monitors the feedforward microphone signal path and/or power consumption of the feedback loop in order to effectively switch ANR configurations prior to an overload event. Overload events can be defined, for example, by a prolonged spike in noise (e.g., greater than approximately 50 milliseconds), and are often characterized acoustically to users by garbled audio output and/or a "clipping" sound. As noted herein, the processor 570 can be configured to switch between ANR configurations in response to detecting an overload event. For example, the processor 570 can be configured to automatically switch from the first ANR configuration to the second ANR configuration in response to detecting that the ambient noise level exceeds a threshold (in some cases, for a defined period). In certain cases, the second ANR configuration provides a decibel-based step function to manage an increase in ambient noise level, e.g., 1-8 decibel (dB) steps, taken incrementally, on a scale in order to manage an increase in ambient noise. In some cases, the steps can be approximately 2-4 dB, with particular examples of approximately 3 dB. Overload management can be beneficial in a variety of scenarios, e.g., in aviation and/or military applications (e.g., piloting planes, helicopters, military vehicles, etc.), as well as in other professional use scenarios such as in sporting event and/or entertainment event scenarios. In various implementations, the processor 570 is configured to switch back to the first ANR configuration after detecting that the overload event has passed, e.g., that the ambient noise level has dropped below the threshold (in some cases, for a defined period). It still further implementations, the processor 570 is configured to switch to one or more of a plurality of additional (e.g., second, third, etc.) ANR configurations for managing overload events, e.g., by switching to ANR configurations with progressive decibel-based step functions, as noted herein.

Overload management can be particularly beneficial in aviation use cases, e.g., in airplanes, helicopters and/or military vehicles. Noise from compressors, propellers, engines, etc. can cause overload events that the processor 570 is configured to manage according to approaches described herein. In certain cases, profiles described herein can be dedicated to one or more use scenarios, and can have overload management settings for those scenarios. For example, where the audio device 10 is an aviation audio device, the processor 570 can be configured to switch between overload management settings based on whether an accessory 420 is connected to the audio device 10 and/or which accessory 420 is connected to the audio device. In these examples, the audio device 10 is configured to apply a profile with a first overload management setting when connected with an accessory 420 that includes a down-cable or another direct connection to an aircraft or military vehicle, and apply a distinct profile with a second overload management setting when connected with a distinct accessory 420 or otherwise disconnected from a down-cable or other direct connection to an aircraft or military vehicle. In still further examples, profiles with overload management settings can be assigned to phases of flight or use. For example, profiles (and corresponding overload management settings) are assigned to the take-off and/or landing phase of flight. In other examples, profiles are assigned to other phases of flight such as ascent, taxi, descent (along with, or in addition to, take-off and/or landing). In various implementations, these phases, or events, can be automatically detected by one or more sensors 510 (FIG. 6) in the audio device 10 and/or another connected device such as an electronic flight bag (e.g., based on altitude readings). As described herein, in some cases, overload management can include progressively switching ANR configurations, e.g., across a range of profiles. Additionally, as described herein, the processor 570 is configured to adjust ANR configurations based on detected ambient noise from sensor(s) 510, e.g., when noise spikes exceed a threshold (e.g. 25 milliseconds (ms), 50 ms, 75 ms, 100 ms, 150 ms, or 200 ms) in order to prevent overload. These approaches can aid in ANR in the frequency range below those mitigated by passive noise cancelation, e.g., below 1 kilo-Hertz (kHz). For example, these ANR configurations can aid in noise reduction at frequencies below 1 kHz, and in particular cases, below 250 Hz (e.g., between 70-250 Hz).

In particular examples, the audio device 10 described herein includes an aviation wearable audio device, such as those depicted in the examples in FIGS. 1 and 2. In certain cases, the audio device 10 can provide particular aviation-related benefits when compared with conventional audio devices. For example, in cases where the accessory 420 is a down-cable configured to connect to an aircraft, the audio device 10 enables selection of an ANR configuration based on identifying the down-cable. In certain cases, the processor 570 is configured to select the first ANR configuration based on detection of the down-cable, e.g., via connector 530 (FIG. 6).

In still further aviation-related cases, the wearable (aviation) audio device 10 is configured to manage operating profiles for specific requirements and/or benefits. For example, the aviation audio device 10 can include memory 580 with multiple memory chips M1, M2, etc., as depicted in FIG. 6. In particular cases, the memory chips M1, M2, etc. are configured to store separate operating profiles for the audio device 10. That is, at least two distinct memory chips (e.g., M1 and M2) store separate operating profiles for the audio device 10. In some cases, the separate operating profiles include a primary operating profile that complies with an aviation operating standard and a secondary operating profile that does not comply with the aviation operating standard. For example, the primary operating profile can comply with requirements of a local, regional or state/national aviation administration, e.g., to ensure that emergency communication capabilities are maintained, or that certain alerts can be received. In these examples, one or more memory chips (e.g. M1) is dedicated to the primary operating profile (e.g., Profile 1), and inhibits alteration of the primary operating profile (Profile 1). In some such examples, M1 is a persistent memory in the audio device 10, and is write-protected or otherwise tamper-proof, such that the memory chip remains dedicated to Profile 1. The persistent memory (M1) is non-volatile, in that it retains its content in the absence of a power supply. In these cases, one or more additional memory chips (e.g., M2, M3, etc.) store additional operating profiles (e.g., M2 stores Profile 2 and/or Profile X). The additional memory chips (e.g., M2, M3, etc.) can be write-protected or otherwise tamper-proof, however, in some implementations the additional memory chips enable alteration of the secondary operating profile(s) (e.g., Profile 2 and/or Profile X). In still further implementations, the additional operating profiles can be stored in a remote memory, such as in a computing device that is physically separate from the audio device 10 (e.g., a smart device, an EFB, a server, etc.). In certain examples, such as where the primary operating profile is designed to comply with an aviation operating standard, the controller 560 is configured to provide a warning or other notification to the user in response to receiving a command to switch from the primary operating profile to a distinct operating profile that is not compliant with the aviation operating standard.

In still further examples where the primary operating profile is designed to comply with an aviation operating standard, the processor 570 can be configured to always cycle through the primary operating profile (P1) when powering on the audio device 10. In these cases, the first time the audio device 10 is powered on, P1 is loaded. The user can then adjust and/or customize the operating profile according to her preferences, and in various implementations, can save that adjusted or customized operating profile as a default or preferred profile. However, even in these cases, the processor 570 can be configured to cycle through the primary operating profile (P1) at subsequent startups. That is, although another operating profile may be selected by the user (e.g., in user preferences, or by a user profile command), the audio device 10 is configured to default to the aviation operating standard-compliant profile should that other operating profile fail to load for any reason. For example, if a user has defined a preferred profile (Profile 2) that is stored in a secondary memory (M2), but that secondary memory (M2) fails to load the profile (Profile 2) for any reason, the processor 570 has already initiated loading Profile 1 (from M1) at power-up, meaning that the audio device 10 remains in compliance with the aviation operating standard. In these cases, the processor 570 reverts to the last-loaded profile (e.g., P1) should a subsequently retrieved profile (e.g., P2) fail to load.

In further examples, such as where M1 is dedicated to Profile 1 and is write-protected (or otherwise tamper-proof), the primary operating profile (Profile 1) is loaded as a default operating profile upon powering on the audio device 10. In some such cases, Profile 1 (stored at dedicated location M1) is loaded as the default operating profile in response to power-up of the audio device 10, regardless of the accessory 420 connected to the audio device 10. In some implementations, the memory chip (M1) has a software CODEC, or otherwise provides data to a local CODEC for loading the primary operating profile (Profile 1) without requiring a computing device. That is, the processor 570 need not pull instructions from an external software CODEC in order to load Profile 1. Additionally, because the memory chip (M1) stores the primary operating profile, the primary operating profile is always accessible in the case of a malfunction or power failure at the accessory 420 or connected computing device. These scenarios may be particularly beneficial in aviation use cases, e.g., to ensure compliance with aviation operating standard(s) and/or guidelines(s) such as those defined by aviation organizations, e.g., the Federal Aviation Administration (FAA). In various implementations, this primary operating profile (Profile 1) meets Technical Standard Orders (TSO) guidelines and/or requirements.

In one example scenario, prior to execution of a power-off command (e.g., by a user via the interface 550, or via an automatic power-off event), the processor 570 initiates storage of the current Profile (including ANR configuration) in persistent memory (M1). In this case, the next time the audio device 10 is powered on, the processor 570 loads the first ANR configuration (and if applicable, other settings from the first Profile), and then checks for triggers to switch to a second ANR configuration, including checking persistent memory (M1) for such configuration(s). In certain cases, if the processor 570 determines that the last-stored Profile (including last-stored ANR configuration) differs from the first ANR configuration, the processor 570 switches from the first ANR configuration to the last-stored ANR configuration (from persistent memory, M1). In these cases, if additional triggers are detected and enabled after switching to the last-stored ANR configuration, the processor 570 loads an additional ANR configuration, distinct from the last-stored ANR configuration.

In examples where the audio device 10 is primarily used as an aviation headset, the first ANR configuration and the last-stored ANR configuration may be the same, i.e., an aviation-appropriate ANR configuration, such as one in compliance with an aviation regulation and/or aviation standard. In various implementations, retrieving the last-stored ANR configuration from persistent memory (M1) is performed as a self-boot of the ANR circuit, unconditionally and without use of any micro-processor(s). As noted herein, power supply is a prerequisite for the ANR circuit, such that the audio device 10 cannot run an ANR configuration without adequate power, and the self-boot of the ANR circuit is performed in response to being powered on.

In additional implementations, replicas of profiles, including ANR configurations, are stored in one or more secondary memory locations that allow a user to modify (e.g., customize) certain settings. For example, a user can customize particular settings from a profile, such as individual earcup audio sensitivity (e.g., to address partial hearing loss in one ear). Because certain profiles (e.g., profile 1) are stored in persistent memory (M1), these profiles may be write protected. However, in these additional implementations, the profile replicas can be write-enabled, e.g., stored in a memory such as M2, M3, or another memory not located at the audio device 10. In certain cases, these replicas can be loaded according to various triggers described herein.

In various additional implementations, operational statistics are stored in the persistent memory (M1). In particular implementations the persistent memory (M1) is configured to store operational statistics such as run time and/or profile characteristics. In various implementations, the processor 570 is configured to pull operational statistics from the persistent memory to trigger reminders, e.g., to provide reminders for service, software updates, etc. Storing the operational statistics in the persistent memory can ensure that such reminders are made in a timely manner.

It is understood that while one or more profiles are described as aviation-specific and/or compliant with an aviation operating standard, these profiles can include sub-profiles or groups of profile settings. In example implementations, distinct sub-profiles are defined for particular aviation purpose, e.g., commercial aviation, private aviation, airplane, helicopter, military aviation, etc. In particular cases, the controller 560 is configured to switch to a particular ANR configuration, or more broadly, a particular profile, based on detecting use in a particular type of aircraft (e.g., by downcable connection with a EFB in a military helicopter as compared with a EFB in a commercial airplane).

In some implementations, the interface 550 allows the user to disable the persistent memory functionality and/or other triggers e.g., using the mechanical switch or other interface functions described herein. In certain examples, in response to the user actuating the interface 550 (e.g., flipping mechanical switch from a first position to a second position and/or third position) the processor 570 does not check the persistent memory (M1) for ANR configurations. In various implementations, the persistent memory (M1) can be disabled using a key or other controlled access device, e.g., in the case of a failure in the persistent memory (M1). In certain cases, the user can disable the persistent memory using the mechanical switch in combination with a key or other controlled access device.

In still further aviation-related examples, the (aviation) audio device 10 has both primary communication functionality and secondary functionality. For example, the primary communication functionality can include radio and/or intercom functionality and microphone functionality, while the secondary functionality can include audio playback (e.g., music), noise reduction (e.g., ANR), overload management, etc. In certain cases, the processor 570 is configured to switch from the first ANR configuration to the second ANR configuration in response to detecting a trigger as described herein. In some cases, the second ANR configuration coincides with a fail-safe operating mode that disables the secondary functionality to prioritize the primary communication functionality. In these examples, secondary functionality such as audio playback and/or overload management are disabled in order to prioritize primary communication (e.g., radio, intercom, etc.). In particular cases, the trigger for automatically switching to a fail-safe operating mode includes detecting an indicator of a power supply failure, a device failure and/or receiving a user command. For example, when external power supply or battery power supply is interrupted or otherwise running low, the processor 570 is configured to switch to fail-safe operating mode. In additional cases, the user can provide a command (e.g., via interface 550, FIG. 6) to switch to fail-safe operating mode. In still further cases, the processor 570 is configured to detect a failure in the audio device 10 and/or a connected device such as an electronic flight bag, down-cable, etc., and switch to the fail-safe operating mode.

In certain additional implementations, which can include aviation-related applications, the processor 570 can be further configured to monitor distinct audio for output (e.g., playback) at the transducer 500 (FIG. 6), and in some cases, process such audio differently. In certain cases, the processor 570 is configured to monitor both primary audio and secondary audio, and to equalize the secondary audio separately from the primary audio. For example, primary audio can include intercom audio and/or radio communication audio, and secondary audio can include auxiliary (AUX) audio (e.g., AUX-input audio) and/or wireless protocol (e.g., Bluetooth, BLE, etc.) audio. In some of these examples, memory (e.g., Profiles) includes multiple sets of EQ configurations. For example, the sets of EQ configurations can include at least one EQ configuration for the primary audio and at least one EQ configuration for the secondary audio.

In still further implementations, the controller 560 is configured to load a preselected or otherwise prioritized profile (including a corresponding ANR configuration) based on user-defined settings. In certain implementations the controller 560 is configured to successively switch ANR configurations after powering on the wearable audio device 10. For example, the controller 560 can be configured to switch from the first ANR configuration to the second ANR configuration in response to triggers described herein. Additionally, in these examples, the controller 560 is configured to switch from the second ANR configuration to a distinct ANR configuration (e.g., the first ANR configuration or a third ANR configuration) successively (e.g., within a matter of seconds) after switching from the first ANR configuration to the second ANR configuration. In these cases, the distinct ANR configuration can be part of a profile that the controller 560 detects as preferred (e.g., predefined in user preferences), or determines is appropriate based on one or more environmental conditions (e.g., indicated by sensors 510). In certain of these examples, the controller 560 is configured to successively switch, or "cycle" through multiple profiles before arriving at a preferred and/or appropriate profile. In various implementations, switching between profiles (including ANR configurations) is performed in a matter of seconds (or less), and may not be noticeable to the user.

In contrast to conventional audio devices, the audio devices 10 according to various implementations provide a number of benefits. For example, the audio devices 10 according to various implementations enable modular accessory interaction, and are configured to adapt device settings based on the accessory attached. Additionally, in some cases, these audio devices 10 are configured for use in a plurality of scenarios and/or industries, e.g., from casual use by a consumer to professional use by a pilot, military personnel, a sporting coach, or an entertainment professional. The audio devices 10 are configured to apply distinct ANR configurations, EQ settings, etc., based on the accessory that is attached. The audio devices 10 can also adjust operating profiles and/or communication priority based on the accessory connected and/or other conditions. The audio devices 10 shown and described according to various implementations can enhance the user experience, as well as improve performance, relative to conventional audio devices.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, accessories (e.g., electronic components) described as being "coupled" can be linked via conventional hard-wired and/or wireless means such that these accessories can communicate data with one another. Additionally, sub-components within a given component can be considered to be linked via conventional pathways, which may not necessarily be illustrated.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

I claim:

1. A wearable audio device comprising:

at least one electro-acoustic transducer;

at least one processor; and memory including instructions executable by the at least one processor, wherein the instructions are configured to apply a first equalization (EQ) setting to first audio provided by a first audio source, the first audio to be played using the at least one electro-acoustic transducer, and apply a second EQ setting different from the first EQ setting to second audio provided by a second audio source, the second audio source being different from the first audio source, the second audio to be played using the at least one electro-acoustic transducer.

2. The wearable audio device of claim 1, wherein the first audio includes communication-based audio, wherein the first EQ setting is applied to enhance voice intelligibility of the communication-based audio.

3. The wearable audio device of claim 1, wherein the second audio includes music playback audio, wherein the second EQ setting is applied to enhance at least one of musical clarity or user preferences for music audio playback.

4. The wearable audio device of claim 1, wherein applying the first EQ setting and applying the second EQ setting is performed in response to detecting an input type for each of the first audio source and the second audio source, respectively.

5. The wearable audio device of claim 4, wherein the input type for the first audio source differs from the input type for the second audio source, and wherein the processor is configured to automatically apply the first EQ setting in response to detecting the input type of the first audio source and automatically apply the second EQ setting in response to detecting the input type of the second audio source.

6. The wearable audio device of claim 5, wherein at least one of the inputs includes a physical accessory input to the wearable audio device, wherein the processor is configured to detect the input type of a respective audio source based on the physical accessory input.

7. The wearable audio device of claim 4, wherein the wearable audio device is an aviation wearable audio device, wherein the processor is configured to detect the input type of a respective audio source based on a physical accessory input to the wearable audio device, wherein at least one of the physical accessory inputs includes a down-cable connected to an aircraft.

8. The wearable audio device of claim 1, wherein the first audio includes at least one of intercom audio or radio communication audio from a first source input, and wherein the second audio includes at least one of auxiliary audio or wireless protocol audio from a second source input.

9. The wearable audio device of claim 1, wherein, in a first audio prioritization mode, the first audio is mixed with the second audio, and, in a second audio prioritization mode, the first audio is played and the second audio is temporarily muted.

10. The wearable audio device of claim 1, wherein at least one of the first EQ setting or the second EQ setting is adjustable based on a selected audio prioritization mode in a set of audio prioritization modes.

11. The wearable audio device of claim 10, wherein, in a first audio prioritization mode, the first audio is mixed with the second audio, and in a second audio prioritization mode, the first audio is played and the second audio is temporarily muted.

12. The wearable audio device of claim 10, wherein the instructions are further configured to adjust at least one of the first EQ setting or the second EQ setting in response to receiving a command to switch the selected audio prioritization mode.

13. The wearable audio device of claim 12, wherein the command to switch the selected audio prioritization mode is received at an interface on the wearable audio device, wherein the interface includes a control feature configured to perform a first function when actuated while a first profile is active on the wearable audio device and perform a second function when actuated while a second profile is active on the wearable audio device, wherein the command includes actuation of the control feature to toggle through distinct audio prioritization modes.

14. The wearable audio device of claim 1, further comprising:

an accessory port, wherein at least one of the first EQ setting or the second EQ setting is selected upon powering on the wearable audio device based on an accessory connected to the accessory port.

15. The wearable audio device of claim 14, wherein the instructions in the memory are further configured to switch between the first EQ setting and the second EQ setting based on detecting at least one of: disconnecting the accessory from the accessory port, or connecting another accessory different from the accessory to the accessory port.

16. The wearable audio device of claim 1, wherein the instructions are configured to switch from the first EQ setting to the second EQ setting in response to the second audio being received from the second audio source.

17. The wearable audio device of claim 1, wherein the first audio includes primary audio and the second audio includes secondary audio, wherein the primary audio includes at least one of intercom audio or radio communication audio, wherein the secondary audio includes at least one of auxiliary audio or wireless protocol audio, and wherein the processor is configured to automatically apply the first EQ setting to the first audio in response to detecting the first audio source, and automatically apply the second EQ setting to the second audio in response to detecting the second audio source.

18. A method of controlling a wearable audio device having at least one electro-acoustic transducer, the method comprising:

applying a first equalization (EQ) setting to first audio provided by a first audio source, the first audio to be played using the at least one electro-acoustic transducer, and applying a second EQ setting different from the first EQ setting to second audio provided by a second audio source, the second audio source being different from the first audio source, the second audio to be played using the at least one electro-acoustic transducer.

19. The method of claim 18, wherein the first audio includes communication-based audio, and wherein the first EQ setting is applied to enhance voice intelligibility of the communication-based audio, wherein the second audio includes music playback audio, wherein the second EQ setting is applied to enhance at least one of musical clarity or user preferences for music audio playback.

20. The method of claim 18, wherein applying the first EQ setting and applying the second EQ setting is performed in response to detecting an input type for each of the first audio source and the second audio source, respectively.

* * * * *